(12) United States Patent
Wang et al.

(10) Patent No.: US 12,335,942 B2
(45) Date of Patent: Jun. 17, 2025

(54) TECHNIQUES FOR REFERENCE SIGNAL PATTERNS

(71) Applicant: QUALCOMM Incorporated, San Diego, CA (US)

(72) Inventors: Xiao Feng Wang, San Diego, CA (US); Alberto Rico Alvarino, San Diego, CA (US); Liangping Ma, San Diego, CA (US); Syed Hashim Ali Shah, Forest Hills, NY (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 17/398,795

(22) Filed: Aug. 10, 2021

(65) Prior Publication Data

US 2022/0104223 A1 Mar. 31, 2022

Related U.S. Application Data

(60) Provisional application No. 63/083,539, filed on Sep. 25, 2020.

(51) Int. Cl.
*H04W 72/1268* (2023.01)
*H04L 5/00* (2006.01)
*H04W 72/23* (2023.01)

(52) U.S. Cl.
CPC ....... *H04W 72/1268* (2013.01); *H04L 5/0048* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 9,986,444 B2 * | 5/2018 | Kim | H04W 24/02 |
| 10,291,378 B1 * | 5/2019 | Bai | H04W 68/02 |

(Continued)

FOREIGN PATENT DOCUMENTS

| | | | | |
|---|---|---|---|---|
| CN | 103873215 A | * | 6/2014 | H04L 1/1861 |
| CN | 106134111 A | * | 11/2016 | H04L 5/0035 |

(Continued)

OTHER PUBLICATIONS

International Search Report and Written Opinion—PCT/US2021/045526—ISA/EPO—Nov. 16, 2021.

(Continued)

*Primary Examiner* — Andrew C Oh
(74) *Attorney, Agent, or Firm* — Holland & Hart LLP

(57) ABSTRACT

Methods, systems, and devices for wireless communications are described. A user equipment (UE) may receive a first indication of a set of reference signal instances within a set of resources. The UE may receive a second indication of a resource element format of a reference signal instance of the set of reference signal instances, the resource element format including one or more null resource elements and one or more reference signal resource elements. The UE may additionally receive, from a base station, a reference signal for estimating carrier frequency offset (CFO) based on the first indication of the set of reference signal instances and the second indication of the resource element format of the reference signal instance. The UE may then communicate with the base station based on receiving the reference signal.

30 Claims, 19 Drawing Sheets

(56) References Cited

U.S. PATENT DOCUMENTS

| | | | |
|---|---|---|---|
| 10,924,235 B2* | 2/2021 | Lee | H04L 5/0064 |
| 11,075,734 B2* | 7/2021 | Ko | H04L 5/0094 |
| 11,570,775 B2* | 1/2023 | Hunukumbure | H04L 5/0048 |
| 11,695,451 B2* | 7/2023 | Cao | H04B 7/0897 375/262 |
| 2011/0317657 A1* | 12/2011 | Chmiel | H04W 72/51 370/310 |
| 2014/0112303 A1* | 4/2014 | Popovic | H04L 5/0044 370/330 |
| 2014/0140444 A1* | 5/2014 | Onishi | H04B 1/10 375/320 |
| 2014/0233407 A1* | 8/2014 | Pourahmadi | H04L 5/0073 370/252 |
| 2016/0316389 A1* | 10/2016 | Kim | H04B 17/345 |
| 2018/0205589 A1* | 7/2018 | Bai | H04L 27/2672 |
| 2018/0227848 A1 | 8/2018 | Lee et al. | |
| 2018/0359069 A1* | 12/2018 | Nam | H04B 17/345 |
| 2019/0124609 A1* | 4/2019 | Gheorghiu | H04W 28/20 |
| 2019/0140729 A1* | 5/2019 | Zhang | H04W 52/16 |
| 2019/0182777 A1* | 6/2019 | Zhang | H04W 52/325 |
| 2019/0230708 A1 | 7/2019 | Bai et al. | |
| 2019/0296876 A1* | 9/2019 | Zhang | H04L 5/0048 |
| 2019/0356463 A1* | 11/2019 | Zhang | H04W 76/27 |
| 2019/0379509 A1* | 12/2019 | Stauffer | H04L 5/0048 |
| 2020/0008228 A1* | 1/2020 | Lee | H04W 72/21 |
| 2020/0052861 A1* | 2/2020 | Li | H04L 5/0007 |
| 2020/0052944 A1* | 2/2020 | Zhang | H04L 5/0007 |
| 2020/0153580 A1* | 5/2020 | Hessler | H04L 1/0011 |
| 2020/0229034 A1* | 7/2020 | Xu | H04L 1/0003 |
| 2020/0389270 A1* | 12/2020 | Lee | H04W 72/20 |
| 2023/0403655 A1* | 12/2023 | Wang | H04L 1/0025 |

FOREIGN PATENT DOCUMENTS

| | | | | |
|---|---|---|---|---|
| CN | 107864494 A | | 3/2018 | |
| CN | 109891774 A | * | 6/2019 | H04B 7/0413 |
| CN | 112153738 A | * | 12/2020 | H04W 72/0473 |
| EP | 2779513 A2 | * | 9/2014 | H04B 7/2656 |
| EP | 2800437 A1 | * | 11/2014 | H04B 17/345 |
| EP | 3537811 A1 | * | 9/2019 | H04L 5/005 |
| EP | 4465580 A2 | * | 11/2024 | H04L 27/26 |
| KR | 20140061439 A | * | 5/2014 | |
| WO | WO-2011115421 A2 | * | 9/2011 | H04B 17/24 |
| WO | WO-2012074346 A1 | * | 6/2012 | H04J 11/0079 |
| WO | WO-2014070411 A1 | * | 5/2014 | H04B 7/024 |
| WO | WO-2015021925 A1 | * | 2/2015 | H04L 5/0053 |
| WO | WO-2017043856 A1 | * | 3/2017 | |
| WO | WO-2017209403 A1 | * | 12/2017 | |
| WO | WO-2017222352 A1 | * | 12/2017 | H04L 1/0013 |
| WO | WO-2018027222 A1 | | 2/2018 | |
| WO | WO-2018128453 A1 | | 7/2018 | |
| WO | WO-2018144337 A1 | * | 8/2018 | H04J 11/0073 |
| WO | WO-2018171683 A1 | | 9/2018 | |
| WO | WO-2018225935 A1 | * | 12/2018 | A61B 17/320068 |
| WO | WO-2019030917 A1 | * | 2/2019 | |
| WO | WO-2020078179 A1 | * | 4/2020 | H04B 7/024 |

OTHER PUBLICATIONS

Thales: "NR-NTN: Chap 7.3—NR Modifications to Support the Non-Terrestrial Network", 3GPP TSG RAN1 Meeting #93, 3GPP Draf, R1-1807794, TR38.811 Chap 7.3 NR Impacts V10, 3rd Generation Partnership Project (3GPP), Mobile Competence Centre, 650, Route Des Lucioles, F-06921 Sophia-Antipolis Cedex, France, No. Busan, Korea, May 21, 2018-May 25, 2018, May 29, 2018 (May 29, 2018), 43 Pages, XP051463502, Retrieved from the Internet: URL: https://www.3gpp.org/ftp/TSG_RAN/WG1_RL1/TSGR1_93/Docs/ [retrieved on May 29, 2018], Section 7. 3. 7. 1.1.

* cited by examiner

TECHNIQUES FOR REFERENCE SIGNAL PATTERNS

CROSS REFERENCE

The present application for patent claims the benefit of U.S. Provisional Patent Application No. 63/083,539 by Wang et al., entitled "TECHNIQUES FOR REFERENCE SIGNAL PATTERNS," filed Sep. 25, 2020, assigned to the assignee hereof, and expressly incorporated by reference herein.

FIELD OF TECHNOLOGY

The following relates to wireless communications, including techniques for reference signal patterns.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, wireless communications signals may be susceptible to carrier frequency offset (CFO), which may result when signals which are transmitted within one subcarrier leak into, or overlap with, another subcarrier at a receiver. Such interference may degrade performance within wireless communications systems.

SUMMARY

The described techniques relate to improved methods, systems, devices, and apparatuses that support techniques for reference signal patterns. Generally, the described techniques provide for improved reference signal patterns for carrier frequency offset (CFO) estimation. In particular, techniques described herein are directed to reference signal patterns with null resource elements resource elements for CFO estimation. In some cases, the null resource elements may be configured as guard bands to mitigate interference from other resource elements and the resource elements that carry the reference signal. In some aspects, a UE may receive a first indication of a set of reference signal instances within a set of resources. The first indication may include a pattern specifying the position of each reference signal instance in the time domain, the frequency domain, or both. The UE may further receive a second indication of a resource element format for at least one reference signal instance. In some aspects, the configuration may include one or more reference signal resource elements (e.g., resource elements which carry the reference signals) and one or more null resource elements for each respective reference signal instance. In particular, each reference signal instance may include one or more reference signal resource elements and null resource elements which separate the one or more reference signal resource elements from other subcarriers in the frequency domain.

In some aspects, the UE may be configured with the patterns for reference signal instances (e.g., reference signal instance formats) and/or resource element formats via radio resource control (RRC) signaling, system information block (SIB) signaling, or both. The UE may subsequently receive a reference signal (e.g., phase-tracking reference signal (PTRS)) from the base station, and may estimate CFO using the received reference signal based on the first indication of the set of reference signal instances and the second indication of the resource element format. By configuring reference signal patterns with null resource elements positioned proximate to reference signal resource elements in the time domain, the techniques described herein may reduce or eliminate interference of the reference signals (e.g., PTRS) which is attributable to CFO. In particular, the null resource elements may separate the reference signal resource elements from other data resource elements within the time domain, therefore making the resource elements of the PTRS less susceptible to CFO. In this regard, techniques described herein may provide for reference signal patterns which enable more accurate CFO estimation, thereby enabling UEs to more accurately compensate for CFO and leading to more efficient and reliable wireless communications.

A method of wireless communication at a UE, the method including is described. The method may include receiving a first indication of a set of reference signal instances within a set of resources, receiving a second indication of a resource element format of a reference signal instance of the set of reference signal instances, the resource element format including one or more null resource elements and one or more reference signal resource elements, receiving, from a base station, a reference signal for estimating CFO based on the first indication of the set of reference signal instances and the second indication of the resource element format of the reference signal instance, and communicating with the base station based on receiving the reference signal.

An apparatus for wireless communication at a UE, the method including is described. The apparatus may include a processor, memory coupled with the processor, and instructions stored in the memory. The instructions may be executable by the processor to cause the apparatus to receive a first indication of a set of reference signal instances within a set of resources, receive a second indication of a resource element format of a reference signal instance of the set of reference signal instances, the resource element format including one or more null resource elements and one or more reference signal resource elements, receive, from a base station, a reference signal for estimating CFO based on the first indication of the set of reference signal instances and the second indication of the resource element format of the reference signal instance, and communicate with the base station based on receiving the reference signal.

Another apparatus for wireless communication at a UE, the method including is described. The apparatus may include means for receiving a first indication of a set of reference signal instances within a set of resources, receiving a second indication of a resource element format of a reference signal instance of the set of reference signal instances, the resource element format including one or more null resource elements and one or more reference signal resource elements, receiving, from a base station, a reference signal for estimating CFO based on the first indication of the set of reference signal instances and the second indication of the resource element format of the reference signal instance, and communicating with the base station based on receiving the reference signal.

A non-transitory computer-readable medium storing code for wireless communication at a UE, the method including is described. The code may include instructions executable by a processor to receive a first indication of a set of reference signal instances within a set of resources, receive a second indication of a resource element format of a reference signal instance of the set of reference signal instances, the resource element format including one or more null resource elements and one or more reference signal resource elements, receive, from a base station, a reference signal for estimating CFO based on the first indication of the set of reference signal instances and the second indication of the resource element format of the reference signal instance, and communicate with the base station based on receiving the reference signal.

Some examples of the method, apparatuses, and non-transitory computer-readable medium described herein may further include operations, features, means, or instructions for receiving, from the base station, a first control message indicating a set of resource element formats for resource elements within the set of reference signal instances, where receiving the second indication of the resource element format of the reference signal instance may be based on receiving the first control message.

In some examples of the method, apparatuses, and non-transitory computer-readable medium described herein, the first control message includes an RRC message, a SIB message, or both.

Some examples of the method, apparatuses, and non-transitory computer-readable medium described herein may further include operations, features, means, or instructions for receiving, from the base station, a second control message indicating the resource element format included within the set of resource element formats, where receiving the second indication of the resource element format of the reference signal instance may be based on receiving the second control message.

In some examples of the method, apparatuses, and non-transitory computer-readable medium described herein, the second control message includes a downlink control information (DCI) message, a medium access control-control element (MAC-CE) message, or both.

Some examples of the method, apparatuses, and non-transitory computer-readable medium described herein may further include operations, features, means, or instructions for receiving, from the base station, a control message including the first indication of the set of reference signal instances, the second indication of the resource element format of the reference signal instance, or both.

Some examples of the method, apparatuses, and non-transitory computer-readable medium described herein may further include operations, features, means, or instructions for transmitting, to the base station, a request for a pattern of a configuration for reference signals associated with estimating the CFO, where receiving the first indication of the set of reference signal instances, the second indication of the resource element format of the reference signal instance, or both, may be based on transmitting the request.

Some examples of the method, apparatuses, and non-transitory computer-readable medium described herein may further include operations, features, means, or instructions for determining one or more parameters associated with communications between the UE and the base station, where transmitting the request may be based on determining the one or more parameters.

In some examples of the method, apparatuses, and non-transitory computer-readable medium described herein, the one or more parameters include a modulation and coding scheme (MCS), an expected CFO, a block error rate (BLER), a frequency density associated with the set of resources, a time density associated with the set of resources, an allowable overhead of the set of resources which may be used for the set of reference signal instances, or any combination thereof.

In some examples of the method, apparatuses, and non-transitory computer-readable medium described herein, receiving the first indication of the set of reference signal instances within the set of resources may include operations, features, means, or instructions for receiving a time density indicator associated with the set of reference signal instances, a frequency density indicator associated with the set of reference signal instances, a resource element offset indicator associated with the set of reference signal instances, a symbol offset indicator associated with the set of reference signal instances, or any combination thereof.

Some examples of the method, apparatuses, and non-transitory computer-readable medium described herein may further include operations, features, means, or instructions for determining an anchor resource element associated with each reference signal instance of the set of reference signal instances, and determining a position of each reference signal instance within the set of resources based on the anchor resource element associated with each reference signal instance, the time density indicator, the frequency density indicator, the resource element offset indicator, the symbol offset indicator, or any combination thereof, where receiving the reference signal may be based on determining the position of each reference signal instance.

In some examples of the method, apparatuses, and non-transitory computer-readable medium described herein, the time density indicator indicates a quantity of reference signal instances per symbol within the set of resources, and the frequency density indicator indicates a quantity of reference signal instances per resource block within the set of resources.

In some examples of the method, apparatuses, and non-transitory computer-readable medium described herein, the resource element offset indicator indicates a first offset in a frequency domain of the set of reference signal instances relative to a first boundary of the set of resources, and where the symbol offset indicator indicates a second offset in a time domain of the set of reference signal instances relative to a second boundary of the set of resources.

In some examples of the method, apparatuses, and non-transitory computer-readable medium described herein, the reference signal instance includes one or more reference signal resources elements and two or more null resource elements, a null resource element of the two or more null resource elements positioned between the one or more reference signal resource elements and a resource element used for other information in a frequency domain.

In some examples of the method, apparatuses, and non-transitory computer-readable medium described herein, a first resource element format for resource elements within a first reference signal instance of the set of reference signal instances may be different from a second resource element format for resource elements within a second reference signal instance of the set of reference signal instances.

In some examples of the method, apparatuses, and non-transitory computer-readable medium described herein, each reference signal instance may be symmetrical in a frequency domain.

In some examples of the method, apparatuses, and non-transitory computer-readable medium described herein, the reference signal instance spans one resource element in a time domain and spans three or more resource elements in a frequency domain.

In some examples of the method, apparatuses, and non-transitory computer-readable medium described herein, the three or more resource elements in the frequency domain include three or more contiguous resource elements in the frequency domain.

In some examples of the method, apparatuses, and non-transitory computer-readable medium described herein, the one or more null resource elements of the reference signal instance include one or more empty subcarriers.

In some examples of the method, apparatuses, and non-transitory computer-readable medium described herein, the reference signal instance includes a first reference signal resource element, a second reference signal resource element, and one or more null resource elements positioned between the first reference signal resource element and the second reference signal resource element in a frequency domain.

In some examples of the method, apparatuses, and non-transitory computer-readable medium described herein, the reference signal instance includes a first reference signal resource element and a second reference signal resource element adjacent to the first reference signal resource element in a frequency domain.

In some examples of the method, apparatuses, and non-transitory computer-readable medium described herein, the reference signal instance may be positioned at a boundary of the set of resources and one or more null resource elements of the reference signal instance may be omitted from the reference signal instance.

Some examples of the method, apparatuses, and non-transitory computer-readable medium described herein may further include operations, features, means, or instructions for performing one or more measurements with the received reference signal, and estimating the CFO based on performing the one or more measurements, where communicating with the base station may be based on the estimated CFO.

In some examples of the method, apparatuses, and non-transitory computer-readable medium described herein, a power of the one or more reference signal resource elements within the set of reference signal instances may be greater than a power of data elements within the set of resources.

In some examples of the method, apparatuses, and non-transitory computer-readable medium described herein, the reference signal for estimating the CFO includes a PTRS.

A method of wireless communication at a base station, the method including is described. The method may include transmitting, to a UE, a first indication of a set of reference signal instances within a set of resources, transmitting, to the UE, a second indication of a resource element format of a reference signal instance of the set of reference signal instances, the resource element format including one or more null resource elements and one or more reference signal resource elements, transmitting, to the UE, a reference signal for estimating CFO based on the first indication of the set of reference signal instances and the second indication of the resource element format of the reference signal instance, and communicating with the UE based on transmitting the reference signal.

An apparatus for wireless communication at a base station, the method including is described. The apparatus may include a processor, memory coupled with the processor, and instructions stored in the memory. The instructions may be executable by the processor to cause the apparatus to transmit, to a UE, a first indication of a set of reference signal instances within a set of resources, transmit, to the UE, a second indication of a resource element format of a reference signal instance of the set of reference signal instances, the resource element format including one or more null resource elements and one or more reference signal resource elements, transmit, to the UE, a reference signal for estimating CFO based on the first indication of the set of reference signal instances and the second indication of the resource element format of the reference signal instance, and communicate with the UE based on transmitting the reference signal.

Another apparatus for wireless communication at a base station, the method including is described. The apparatus may include means for transmitting, to a UE, a first indication of a set of reference signal instances within a set of resources, transmitting, to the UE, a second indication of a resource element format of a reference signal instance of the set of reference signal instances, the resource element format including one or more null resource elements and one or more reference signal resource elements, transmitting, to the UE, a reference signal for estimating CFO based on the first indication of the set of reference signal instances and the second indication of the resource element format of the reference signal instance, and communicating with the UE based on transmitting the reference signal.

A non-transitory computer-readable medium storing code for wireless communication at a base station, the method including is described. The code may include instructions executable by a processor to transmit, to a UE, a first indication of a set of reference signal instances within a set of resources, transmit, to the UE, a second indication of a resource element format of a reference signal instance of the set of reference signal instances, the resource element format including one or more null resource elements and one or more reference signal resource elements, transmit, to the UE, a reference signal for estimating CFO based on the first indication of the set of reference signal instances and the second indication of the resource element format of the reference signal instance, and communicate with the UE based on transmitting the reference signal.

Some examples of the method, apparatuses, and non-transitory computer-readable medium described herein may further include operations, features, means, or instructions for transmitting, to the UE, a first control message indicating a set of resource element formats for resource elements within the set of reference signal instances, where transmitting the second indication of the resource element format of the reference signal instance may be based on transmitting the first control message.

In some examples of the method, apparatuses, and non-transitory computer-readable medium described herein, the first control message includes an RRC message, a SIB message, or both.

Some examples of the method, apparatuses, and non-transitory computer-readable medium described herein may further include operations, features, means, or instructions for transmitting, to the UE, a second control message indicating the resource element format included within the set of resource element formats, where transmitting the second indication of the resource element format of the reference signal instance may be based on receiving the second control message.

In some examples of the method, apparatuses, and non-transitory computer-readable medium described herein, the second control message includes a DCI message, a MAC-CE message, or both.

Some examples of the method, apparatuses, and non-transitory computer-readable medium described herein may further include operations, features, means, or instructions for transmitting, to the UE, a control message including the first indication of the set of reference signal instances, the second indication of the resource element format of the reference signal instance, or both.

Some examples of the method, apparatuses, and non-transitory computer-readable medium described herein may further include operations, features, means, or instructions for receiving, from the UE, a request for a pattern of a configuration for reference signals associated with estimating the CFO, where transmitting the first indication of the set of reference signal instances, the second indication of the resource element format of the reference signal instance, or both, may be based on receiving the request.

Some examples of the method, apparatuses, and non-transitory computer-readable medium described herein may further include operations, features, means, or instructions for determining one or more parameters associated with communications between the UE and the base station, where transmitting the first indication of the set of reference signal instances, the second indication of the resource element format, or both, may be based on determining the one or more parameters.

In some examples of the method, apparatuses, and non-transitory computer-readable medium described herein, the one or more parameters include an MCS, an expected CFO, a BLER, a frequency density associated with the set of resources, a time density associated with the set of resources, an allowable overhead of the set of resources which may be used for the set of reference signal instances, or any combination thereof.

In some examples of the method, apparatuses, and non-transitory computer-readable medium described herein, transmitting the first indication of the set of reference signal instances within the set of resources may include operations, features, means, or instructions for transmitting a time density indicator associated with the set of reference signal instances, a frequency density indicator associated with the set of reference signal instances, a resource element offset indicator associated with the set of reference signal instances, a symbol offset indicator associated with the set of reference signal instances, or any combination thereof.

Some examples of the method, apparatuses, and non-transitory computer-readable medium described herein may further include operations, features, means, or instructions for determining an anchor resource element associated with each reference signal instance of the set of reference signal instances, and determining a position of each reference signal instance within the set of resources based on the anchor resource element associated with each reference signal instance, the time density indicator, the frequency density indicator, the resource element offset indicator, the symbol offset indicator, or any combination thereof, where transmitting the reference signal may be based on determining the position of each reference signal instance.

In some examples of the method, apparatuses, and non-transitory computer-readable medium described herein, the time density indicator indicates a quantity of reference signal instances per symbol within the set of resources, and the frequency density indicator indicates a quantity of reference signal instances per resource block within the set of resources.

In some examples of the method, apparatuses, and non-transitory computer-readable medium described herein, the resource element offset indicator indicates a first offset in a frequency domain of the set of reference signal instances relative to a first boundary of the set of resources, and where the symbol offset indicator indicates a second offset in a time domain of the set of reference signal instances relative to a second boundary of the set of resources.

In some examples of the method, apparatuses, and non-transitory computer-readable medium described herein, the reference signal instance includes one or more reference signal resources elements and two or more null resource elements, a null resource element of the two or more null resource elements positioned between the one or more reference signal resource elements and a resource element used for other information in a frequency domain.

In some examples of the method, apparatuses, and non-transitory computer-readable medium described herein, a first resource element format for resource elements within a first reference signal instance of the set of reference signal instances may be different from a second resource element format for resource elements within a second reference signal instance of the set of reference signal instances.

In some examples of the method, apparatuses, and non-transitory computer-readable medium described herein, each reference signal instance may be symmetrical in a frequency domain.

In some examples of the method, apparatuses, and non-transitory computer-readable medium described herein, the reference signal instance spans one resource element in a time domain and spans three or more resource elements in a frequency domain.

In some examples of the method, apparatuses, and non-transitory computer-readable medium described herein, the three or more resource elements in the frequency domain include three or more contiguous resource elements in the frequency domain.

In some examples of the method, apparatuses, and non-transitory computer-readable medium described herein, the one or more null resource elements of the reference signal instance include one or more empty subcarriers.

In some examples of the method, apparatuses, and non-transitory computer-readable medium described herein, the reference signal instance includes a first reference signal resource element, a second reference signal resource element, and one or more null resource elements positioned between the first reference signal resource element and the second reference signal resource element in a frequency domain.

In some examples of the method, apparatuses, and non-transitory computer-readable medium described herein, the reference signal instance includes a first reference signal resource element and a second reference signal resource element adjacent to the first reference signal resource element in a frequency domain.

In some examples of the method, apparatuses, and non-transitory computer-readable medium described herein, the reference signal instance may be positioned at a boundary of the set of resources and one or more null resource elements of the reference signal instance may be omitted from the reference signal instance.

In some examples of the method, apparatuses, and non-transitory computer-readable medium described herein, a power of the one or more reference signal resource elements within the set of reference signal instances may be greater than a power of data elements within the set of resources.

In some examples of the method, apparatuses, and non-transitory computer-readable medium described herein, the reference signal for estimating the CFO includes a PTRS.

DETAILED DESCRIPTION

Figure 1:
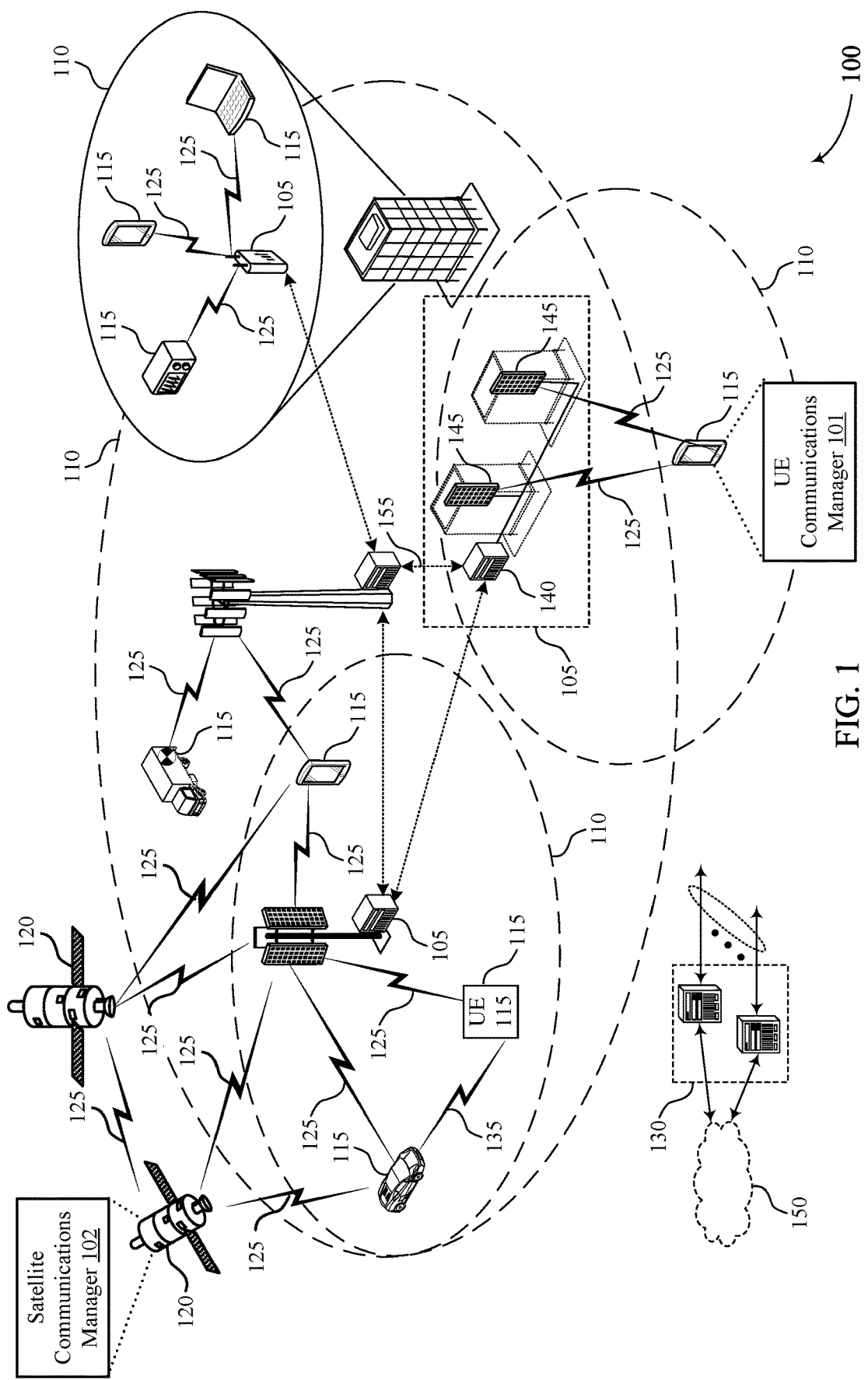
FIG. 1 illustrates an example of a wireless communications system that supports techniques for reference signal patterns in accordance with aspects of the present disclosure.

In some wireless communications systems, wireless communications signals (e.g., orthogonal frequency division multiplexing (OFDM) signals) may be susceptible to carrier frequency offset (CFO). CFO may result when signals which are transmitted within one subcarrier leak into, or overlap with, another subcarrier at a receiver. In some cases, CFO may result from mismatches between oscillators at the transmitting and receiving devices. Additionally or alternatively, Doppler effects attributable to the relative mobility between the transmitting and receiving devices may lead to CFO. For example, Doppler effects may be more pronounced in non-terrestrial networks (NTNs) because of the fast movement of satellites relative to a terrestrial-based UE. In some cases, CFO may result in significant performance degradation within wireless communications systems. Some wireless communications systems may use phase tracking reference signals (PTRSs) to estimate and account for CFO. However, in cases with significant CFO, neighboring data transmitted on subcarriers which are proximate to subcarriers on which the PTRSs are transmitted may interfere with the PTRS subcarriers, thereby negatively affecting CFO estimation. In such cases, wireless devices within the wireless communication system may be unable to accurately estimate and account for CFO within the wireless communications system, thereby leading to increased noise and reducing the efficiency and reliability of wireless communications.

Techniques for improved reference signal patterns for CFO estimation are disclosed. In particular, techniques described herein are directed to reference signal patterns with null resource elements for CFO estimation. A null resource element may refer to a resource element that is not used to communicate a signal or information. In some cases, the null resource elements may be configured as guard bands (or guard resource elements) to mitigate interference from other resource elements and the resource elements that carry the reference signal (e.g., reference signal resource elements). In some aspects, a UE may receive a first indication of a set of reference signal instances within a set of resources (e.g., set of resources allocated for communications at the UE). The first indication may include a pattern specifying the position of each reference signal instance in the time domain, the frequency domain, or both. The UE may further receive a second indication of a resource element format for resource elements within at least one reference signal instance of the set of reference signal instances. In some aspects, the resource element format may include one or more reference signal resource elements (e.g., PTRS resource elements) and one or more null resource elements for the respective reference signal instance. In particular, each reference signal instance may include one or more reference signal resource elements and null resource elements which separate the one or more reference signal resource elements from other subcarriers in the frequency domain.

In some aspects, the UE may be configured with the patterns for reference signal instances and/or resource element configurations via radio resource control (RRC) signaling, system information block (SIB) signaling, or both. The UE may subsequently receive a reference signal (e.g., PTRS) from the base station, and may estimate CFO using the received reference signal based on the first indication of the set of reference signals and the second indication of the resource element format. By configuring reference signal patterns with null resource elements positioned proximate to reference signal resource elements in the frequency domain, the techniques described herein may reduce or eliminate interference of the reference signals (e.g., PTRS) which is attributable to CFO. In particular, the null resource elements may separate the reference signal resource elements from other data resource elements within the frequency domain, therefore making the resource elements of the PTRS less susceptible to CFO. In this regard, techniques described herein may provide for reference signal patterns which enable more accurate CFO estimation, thereby enabling UEs to more accurately compensate for CFO and leading to more efficient and reliable wireless communications.

Aspects of the disclosure are initially described in the context of wireless communications systems. Additional aspects of the disclosure are described in the context of example resource allocation schemes and an example process flow. Aspects of the disclosure are further illustrated by and described with reference to apparatus diagrams, system diagrams, and flowcharts that relate to techniques for reference signal patterns.

FIG. 1 illustrates an example of a wireless communications system 100 that supports techniques for reference signal patterns in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 155 (e.g., via an S1, N2, N3, or other interface). The base stations 105 may communicate with one another over the backhaul links 155 (e.g., via an X2, Xn, or other interface) either directly (e.g., directly between base stations 105), or indirectly (e.g., via core network 130), or both. In some examples, the backhaul links 155 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1. In some aspects, each UE 115 may include a communications manager 101 which is configured to facilitate communications with other wireless devices (e.g., base stations 105, satellites 120, other UEs 115).

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 includes base stations 105, UEs 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Wireless communications system 100 may also include one or more satellites 120. Satellite 120 may communicate with base stations 105 (also referred to as gateways in NTNs) and UEs 115 (or other high altitude or terrestrial communications devices). Satellite 120 may be any suitable type of communication satellite configured to relay communications between different end nodes in a wireless communications system. Satellite 120 may be an example of a space satellite, a balloon, a dirigible, an airplane, a drone, an unmanned aerial vehicle, or the like. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. For example, a satellite 120 may support a first cell and a second cell, where a first beam of the satellite 120 supports the first cell and a second beam of the satellite 120 supports the second cell. The satellite 120 may be any distance away from the surface of the earth. In some aspects, each satellite 120 may include a communications manager 102 which is configured to facilitate communications with other wireless devices (e.g., base stations 105, UEs 115, other satellites 120).

In some cases, a cell may be provided or established by a satellite 120 as part of a non-terrestrial network. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a UE 115 or base station 105, or vice-versa.

As noted previously herein, wireless communications signals may be susceptible to CFO, which may result from mismatches between oscillators at the transmitting and receiving wireless devices, Doppler effects, or both. CFO attributable to Doppler effects may be more pronounced in the context of NTNs due to the fast movement of satellites 120 relative to terrestrial-based UEs 115. If left unaddressed, CFO may result in significant performance degradation within wireless communications systems. Some wireless communications systems have attempted to utilize PTRSs to estimate and account for CFO. However, in cases with significant CFO, neighboring data transmitted on subcarriers which are proximate to subcarriers on which the PTRSs are transmitted may interfere with the PTRS subcarriers, thereby negatively affecting CFO estimation.

Accordingly, the UEs 115, the base stations 105, and the satellites 120 of the wireless communications system 100 may support techniques for improved reference signal patterns for CFO estimation. In particular, the wireless communications system 100 may support reference signal patterns (e.g., PTRS patterns) with null resource elements for CFO estimation. By utilizing null resource elements as guard bands within reference signal patterns, techniques described herein may mitigate interference within reference signals which is attributable to CFO, thereby enabling improved CFO estimation, which may result in improved efficiency and reliability of wireless communications.

For example, a UE 115 of the wireless communications system 100 may receive, from a base station 105 and/or satellite 120, a first indication of a set of reference signal instances within a set of resources. The first indication may include a pattern specifying the position of each reference signal instance (e.g., reference signal instance format) in the time domain, the frequency domain, or both. The UE 115 may further receive a second indication of a resource element format for at least one reference signal instance of the set of reference signal instances. In some aspects, the resource element format may include one or more reference signal resource elements (e.g., PTRS resource elements) and one or more null resource elements for each respective reference signal instance. In particular, each reference signal instance may include one or more reference signal resource elements and one or more null resource elements which separate the one or more reference signal resource elements from other subcarriers in the frequency domain. Subsequently, the UE 115 may receive a reference signal (e.g., PTRS) from the base station 105 and/or satellite 120 based on the first indication of the set of reference signals (e.g., reference signal instance format) and the second indication of the resource element format of the reference signal instances, and may estimate CFO using the received reference signal.

In some aspects, the UE 115 may be configured (e.g., pre-configured) with the patterns for reference signal instances and/or resource element formats via RRC signaling, SIB signaling, or both. The base station 105 and/or satellite 120 may then transmit subsequent control messages (e.g., medium access control-control element (MAC-CE) messages, downlink control information (DCI) messages) which indicate to the UE 115 which reference signal instance pattern(s) and/or resource element format(s) the UE 115 is to use. Additionally or alternatively, the UE 115 may not be pre-configured with reference signal instance patterns and/or resource element patterns. In such cases, the base station 105 and/or satellite 120 may dynamically indicate which reference signal instance formats and/or resource element formats the UE 115 is to use via dynamic control signaling (e.g., RRC signaling, SIB signaling).

Techniques described herein may support improved reference signal patterns which enable improved CFO estimation. By configuring reference signal patterns with null resource elements positioned proximate to reference signal resource elements in the frequency domain, the techniques described herein may reduce or eliminate interference of the reference signals (e.g., PTRS) which is attributable to CFO. In particular, the null resource elements may separate the reference signal resource elements from other data resource elements within the frequency domain, therefore making the resource elements of the PTRS less susceptible to CFO. In this regard, techniques described herein may provide for reference signal patterns which enable more accurate CFO estimation, thereby enabling UEs 115 to more accurately compensate for CFO and leading to more efficient and reliable wireless communications within the wireless communications system 100.

Figure 2:
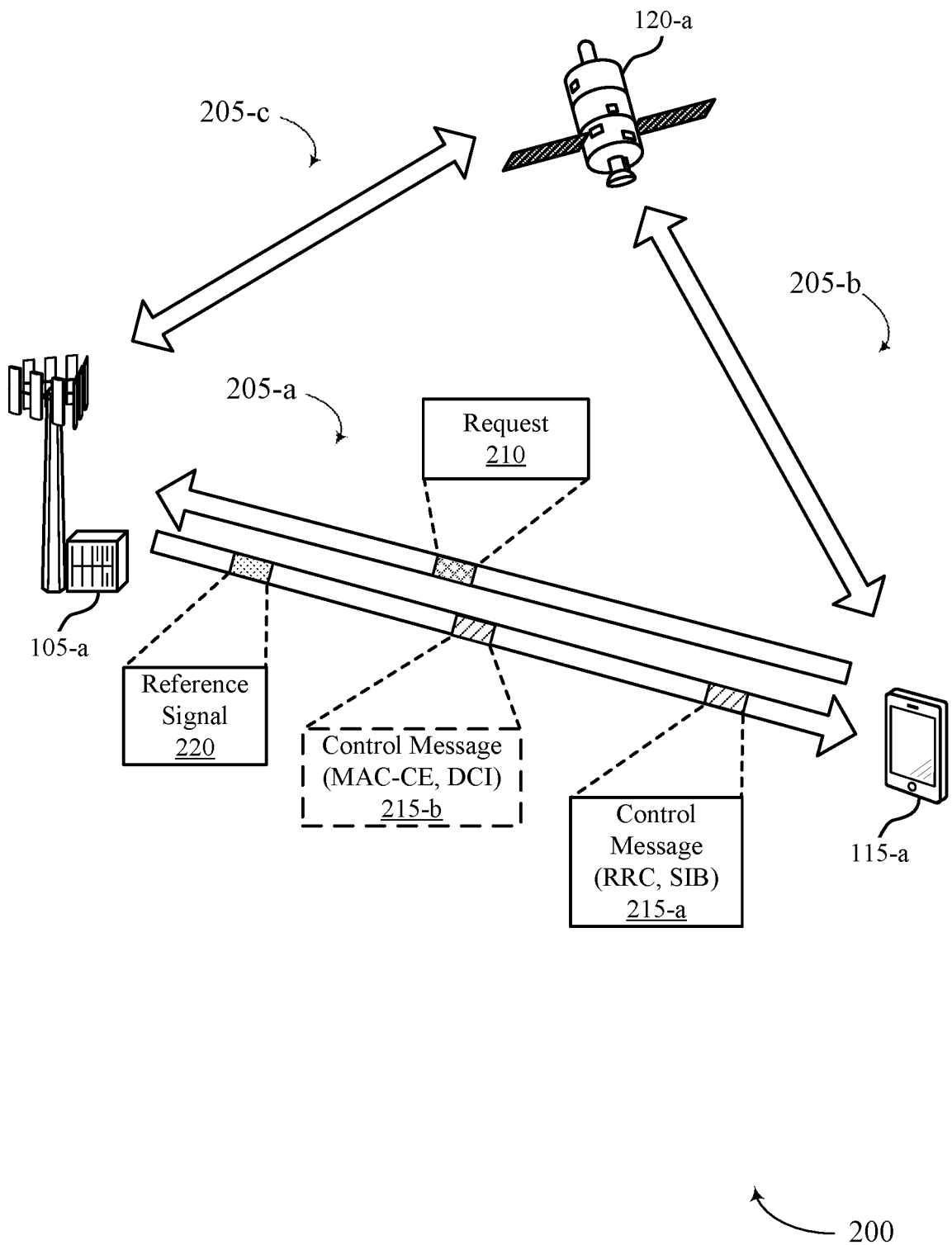
FIG. 2 illustrates an example of a wireless communications system that supports techniques for reference signal patterns in accordance with aspects of the present disclosure.

FIG. 2 illustrates an example of a wireless communications system 200 that supports techniques for reference signal patterns in accordance with aspects of the present disclosure. In some examples, wireless communications system 200 may implement aspects of wireless communications system 100. The wireless communications system 200 may include a UE 115-*a*, a base station 105-*a*, and a satellite 120-*a*, which may be examples of UEs 115, base stations 105, and satellites 120 as described with reference to FIG. 1.

The UE 115-*a* may communicate with the base station 105-*a* using a communication link 205-*a*, and may similarly communicate with the satellite 120-*a* using a communication link 205-*b*. Moreover, the satellite 120-*a* and the base station 105-*a* may communicate using a communication link 205-*c*. In some cases, the communication links 205-*a*, 205-*b*, and 205-*c* may include examples of access links (e.g., a Uu links). The communication links 205-*a*, 205-*b*, and 205-*c* may include bi-directional links that can include both uplink and downlink communication. For example, the UE 115-*a* may transmit uplink transmissions, such as uplink control signals or uplink data signals, to the base station 105-*a* using the communication link 205-*a*, and the base station 105-*a* may transmit downlink transmissions, such as downlink control signals or downlink data signals, to the UE 115-*a* using the communication link 205-*a*. In some aspects, the communication link 205-*a* may be understood as a logical concept in which communications take place between the UE 115-*a* and the base station 105-*a* via the communication link 205-*b* between the UE 115-*a* and the satellite 120-*a* and the communication link 205-*c* between the satellite 120-*a* and the base station 105-*a*. In such cases, the satellite 120-*a* may serve as a relay or bent-pipe satellite 120-*a*.

In some aspects, the satellite 120-*a* may be associated with a global navigation system (e.g., global navigation satellite system (GNSS) or global positioning system (GPS)). In this regard, wireless communications system 200 may be associated with an NTN. The wireless communications system 200 may support transmissions between the UE 115-*a* and the satellite 120-*a* via a communication link 205-*b*. For example, UE 115-*a* may transmit uplink transmissions to the satellite 120-*a* via the communication link 205-*b*, and the satellite 120-*a* may transmit downlink transmissions to the UE 115-*a* via communication link 205-*b*.

The satellite 120-a may be in an orbit, such as low earth orbit, medium earth orbit, geostationary earth orbit, or other non-geostationary earth orbit. In any of these examples, the satellite 120-a may be many thousands of kilometers from Earth, and therefore may be thousands of kilometers from the UE 115-a. Therefore, each transmission between the satellite 120-a and the UE 115-a may therefore travel from Earth the distance to the satellite 120-a and back to Earth.

In some wireless communications systems, wireless communications signals may be susceptible to CFO, which may result from mismatches between oscillators at the transmitting and receiving wireless devices, Doppler effects, or both. CFO attributable to Doppler effects may be more pronounced in the context of NTNs due to the fast movement of satellites 120 (e.g., satellite 120-a) relative to a position terrestrial-based UEs 115 (e.g., UE 115-a). If left unaddressed, CFO may result in significant performance degradation within wireless communications systems. Some wireless communications systems have attempted to utilize PTRSs to estimate and account for CFO. However, in cases with significant CFO, neighboring data transmitted on subcarriers which are proximate to subcarriers on which the PTRSs are transmitted may interfere with the PTRS subcarriers, thereby negatively affecting CFO estimation.

Accordingly, the UE 115-a, the base station 105-a, and the satellite 120-a of the wireless communications system 200 may support techniques for improved reference signal patterns for CFO estimation. In particular, the wireless communications system 200 may support reference signal patterns (e.g., PTRS patterns) with null resource elements for CFO estimation. By utilizing null resource elements as guard bands within reference signal patterns, techniques described herein may mitigate interference within reference signals which is attributable to CFO, thereby enabling improved CFO estimation, which may result in improved efficiency and reliability of wireless communications.

While signaling used to implement aspects of the present disclosure are shown and described as being carried out on the communication link 205-a between the UE 115-a and the base station 105-b for the purposes of simplicity, this signaling may additionally or alternatively be carried out over the communication link 205-b between the UE 115-a and the satellite 120-a and/or communication link 205-c between the satellite 120-a and the base station 105-a.

For example, in some aspects, the UE 115-a, the base station 105-a, or both, may determine one or more parameters associated with communications between the UE 115-a and the base station 105-a. For example, the UE 115-a and/or the base station 105-a may determine a set of resources (e.g., time resources, frequency resources, spatial resources) for wireless communications, and may determine one or more parameters associated with communications between the UE 115-a and the base station 105-a over the determined set of resources. In some cases, the set of resources may include a set of resources allocated for communications at the UE 115-a. The one or more parameters associated with communications between the UE 115-a and the base station 105-a may include, but are not limited to, a modulation and coding scheme (MCS), an expected and/or estimated CFO expected to be experienced at the UE 115-a, a block error rate (BLER) determined by the UE 115-a, a frequency density and/or time density associated with the set of resources, or any combination thereof. In some cases, the set of parameters may additionally or alternatively include an available overhead within the set of resources which may be used for a set of reference signal instances associated with a reference signal 220 used for CFO estimation (e.g., what percentage of resources may be allocated for reference signals 220). In some aspects, the UE 115-a and/or the base station 105-a may determine the one or more parameters by performing measurements on signals (e.g., reference signals) received from the other device.

In some aspects, the UE 115-a may transmit a request 210 for a pattern of a configuration for reference signals 220 associated with measuring CFO (e.g., request for reference signal instance format(s) and/or resource element format(s)). In some aspects, the UE 115-a may transmit the request 210 for the pattern of the configuration for reference signals 220 (e.g., PTRS pattern) based on determining the one or more parameters for communications between the UE 115-a and the base station 105-a (e.g., MCS, BLER, expected CFO). In some aspects, the request 210 may include an indication of the one or more determined parameters. The request 210 may be transmitted via a MAC-CE message, a channel state information (CSI) feedback message, an RRC message, or any combination thereof. In this regard, the request may be transmitted via a physical uplink control channel (PUCCH), a physical uplink shared channel (PUSCH), or both.

In some aspects, the UE 115-a may receive and/or determine a first indication of a set of reference signal instances (e.g., reference signal instance format) within the set of resources (e.g., within the set of resources allocated for communications at the UE 115-a). In some aspects, a reference signal instance format may be used to indicate or determine the relative position of reference signal instances associated with a reference signal 220 (e.g., PTRS) within the set of resources. In some aspects, the UE 115-a may receive and/or determine the first indication of the set of reference signal instances based on determining the parameters for communications between the UE 115-a and the base station 105-a, transmitting the request 210 for the pattern of the configuration of reference signals 220, or both.

Additionally, the UE 115-a may receive a second indication of one or more resource element formats associated with at least one reference signal instance of the set of reference signal instances. In some aspects, the one or more resource element formats may be used to determine a configuration and/or format of resource elements within the at least one reference signal instance. In some aspects, the UE 115-a may receive and/or determine the second indication of the resource element format based on determining the parameters for communications between the UE 115-a and the base station 105-a, transmitting the request 210 for the pattern of the configuration of reference signals 220, receiving the first indication of the set of reference signal instances, or any combination thereof.

The first indication of the set of reference signal instances and the second indication of the resource element format may be received via the same signals and/or messages from the base station 105-a, via separate signals and/or messages from the base station 105-a, or both. In some aspects, the first indication of the set of reference signal instances and the second indication of the resource element format may be received via one or more control messages from the base station 105-a.

For example, in some cases, the base station 105-a may dynamically indicate the first indication and/or the second indication to the UE 115-a via control messages. For instance, each time the UE 115-a is to be configured with a new and/or different pattern for reference signals 220 used to estimate CFO, the base station 105-a may transmit a first control message 215-a to the UE 115-a, where the first control message 215-a includes the first indication of the set of reference signal instances, the second indication of the resource element format, or both. In this example, the first control message 215-*a* may include an RRC message, a SIB message, or both.

In additional or alternative cases, the UE 115-*a* may receive the first indication of the set of reference signal instances, the second indication of the resource element format(s), or both, via multiple control messages 215. In particular, the UE 115-*a* may be configured (e.g., pre-configured) with a set of reference signal instance formats and/or a set of resource element formats via a first control message 215-*a*, and may be instructed, via a second control message 215-*b*, as to which reference signal instance format from the set of reference signal instance formats and/or which resource element format from the set of resource element formats which are to be used by the UE 115-*a*.

For example, the UE 115-*a* may receive, from the base station 105-*a*, a first control message 215-*a* (e.g., RRC message, SIB message) indicating a set of patterns of configurations for reference signals 220 associated with measuring CFO. In this regard, the first control message 215-*a* may include an indication of a set of reference signal instance formats for reference signals 220 associated with measuring CFO, a set of resource element formats for reference signals 220 associated with measuring CFO, or both. In some aspects, each reference signal instance format may be used indicate or determine the relative position of reference signal instances associated with a reference signal 220 (e.g., PTRS) within a set of resources. Additionally, each resource element format may be used to indicate or determine formats and/or configurations of resource elements within one or more reference signal instances of a reference signal 220 (e.g., PTRS). In some aspects, the set of patterns for configurations of reference signals 220 (e.g., set of reference signal instance formats, set of resource element formats) may be indicated via one or more bit values or index values.

Continuing with the same example, the UE 115-*a* may subsequently receive, from the base station 105-*a*, a second control message 215-*b* (e.g., MAC-CE message, DCI message) indicating a pattern of a configuration for reference signals 220 associated with measuring CFO which is included in the set of patterns of configurations for reference signals indicated in the first control message 215-*a*. For instance, in cases where the first control message 215-*a* indicates a set of reference signal instance formats, the second control message 215-*b* may include an indication of one or more reference signal instance formats which are included in the set of reference signal instance formats which are to be used by the UE 115-*a*. Similarly, in cases where the first control message 215-*a* indicates a set of resource element formats, the second control message 215-*b* may include an indication of one or more resource element formats which are included in the set of resource element formats which are to be used by the UE 115-*a*.

In this regard, in some cases, the first control message 215-*a* may be used to pre-configure the UE 115-*a* with a set of patterns for configurations of reference signals 220, and the second control message 215-*b* may be used to indicate to the UE 115-*a* which pattern is to be used. In such cases, the UE 115-*a* may be configured to receive the first indication of the set of reference signal instances, the second indication of the resource element format, or both, based on the first control message 215-*a*, the second control message 215-*b*, or both.

In some aspects, the first indication of the set of reference signal instances may include an indication of one or more parameters which may be used to determine the relative position of each reference signal instance of the set of reference signal instances within the set of resources. For example, the first indication may include a time density indicator associated with the set of reference signal instances, a frequency density indicator associated with the set of reference signal instances, a resource element offset indicator associated with the set of reference signal instances, a symbol offset indicator associated with the set of reference signal instances, or any combination thereof.

The time density indicator may indicate a quantity of reference signal instances per symbol within the set of resources, and the frequency density indicator may indicate a quantity of reference signal instances per resource block within the set of resources. Moreover, the resource element offset indicator may indicate a first offset in the frequency domain of the set of reference signal instances relative to a first boundary of the set of resources, and the symbol offset indicator indicates a second offset in the time domain of the set of reference signal instances relative to a second boundary of the set of resources.

In some aspects, each resource element format may include one or more null resource elements and one or more reference signal resource elements (e.g., resource elements which carry the data of the reference signals 220). In this regard, each reference signal instance associated with the resource element format received via the second indication may include one or more null resource elements and one or more reference signal resource elements. In some aspects, the resource element format may be configured such that the reference signal instances associated with the resource element format are symmetrical in the frequency domain. Moreover, each reference signal instance may span one resource element in the time domain, and may span three or more resource elements in the frequency domain. In some aspects, the resource elements of each reference signal instance may be contiguous (e.g., consecutive) in the frequency domain. For example, reference signal instances associated with the resource element format indicated in the second indication may include one or more reference signal resource elements and two or more null resource elements positioned between the one or more reference signal resource elements and resource elements used for other information (e.g., data resource elements) in the frequency domain. In this example, each null resource element of the two or more null resource elements may be positioned on opposite sides of the one or more reference signal resource elements in the frequency domain. Accordingly, in some cases, the null resource elements may serve as a guard band between the reference signal resource elements and other resource elements (e.g., data resource elements) in the frequency domain.

By way of another example, reference signal instances associated with the resource element format may include a first reference signal resource element, a second reference signal resource element, and one or more null resource elements positioned between the first reference signal resource element and the second reference signal resource element in the frequency domain. By way of another example, reference signal instances associated with the resource element format may include a first reference signal resource element and a second reference signal resource element adjacent to the first reference signal resource element in the frequency domain.

In some cases, the set of reference signal instances may be associated with multiple resource element formats. For example, a first reference signal instance may be associated with a first resource element format, and a second reference signal instance may be associated with a second resource element format different from the first resource element format. In some cases, one or more reference signal instances may be positioned at and/or across a boundary of the set of resources (e.g., positioned at and/or across a boundary of a set of resources allocated for communications at the UE 115-a). In such cases, one or more null resource elements of the one or more reference signal instances may be omitted based on the resource element format and the relative position of the one or more reference signal instances relative to the boundary of the set of resources. This will be discussed in further detail herein with respect to FIG. 6.

In some aspects, the UE 115-a may determine an anchor resource element associated with each reference signal instance of the set of reference signal instances. The anchor resource element may be used to determine the relative position of each reference signal instance of the set of reference signal instances within the set of resources. In this regard, the UE 115-a may determine the anchor resource element associated with each reference signal instance based on receiving the first indication of the set of reference signal instances (e.g., reference signal instance format), receiving the second indication of the one or more resource element formats, or both. For example, the UE 115-a may determine the anchor resource element associated with each reference signal instance based on the control messages 215 received from the base station 105-a (e.g., RRC signaling, SIB signaling, MAC-CE messaging, DCI messaging).

Subsequently, the UE 115-a may determine a position of each reference signal instance of the set of reference signal instances based on receiving the first indication of the set of reference signal instances (e.g., reference signal instance format), receiving the second indication of the one or more resource element formats, determining the anchor resource elements of each reference signal instance, or any combination thereof.

For example, the first indication of the set of reference signal instances may include an indication of one or more parameters and/or characteristics which may be used to determine the position of the reference signal instances. For instance, the first indication of the set of reference signal instances may include an indication of a time density indicator associated with the set of reference signal instances, a frequency density indicator associated with the set of reference signal instances, a resource element offset indicator associated with the set of reference signal instances, a symbol offset indicator associated with the set of reference signal instances, or any combination thereof. In this example, the UE 115-a may determine the position of each reference signal instance within the set of resources based on the anchor resource element associated with each reference signal instance, the time density indicator, the frequency density indicator, the resource element offset indicator, the symbol offset indicator, or any combination thereof. In some aspects, the received indicators (e.g., time density indicator, frequency density indicator, resource element offset indicator, symbol offset indicator) may be defined relative to the anchor resource elements of the reference signal instances. Accordingly, the UE 115-a may be configured to determine the position of reference signal instances by applying the received indicators (e.g., time density indicator, frequency density indicator, resource element offset indicator, symbol offset indicator) to one or more anchor resource elements associated with the reference signal instances.

In some aspects, the UE 115-a may receive a reference signal 220 from the base station 105-a. In some aspects, the reference signal 220 may be configured for estimating CFO. In this regard, the reference signal 220 may include, but is not limited to, a PTRS. In some aspects, the UE 115-a may receive the reference signal 220 based on determining the parameters for communications between the UE 115-a and the base station 105-a (e.g., MCS, BLER, estimated CFO), transmitting the request 210 for the pattern of the configuration of the reference signal 220, receiving the first indication of the set of reference signal instances, receiving the second indication of the one or more resource element formats, determining the anchor resource elements, determining the position of each reference signal instance, or any combination thereof.

For example, the base station 105-a may transmit the reference signal 220 (e.g., PTRS) based on a reference signal instance format indicated in the first indication of the set of reference signal instances, based on the one or more resource element formats indicated in the second indication, or both. In some aspects, the UE 115-a may receive the reference signal 220 by monitoring the determined positions of the reference signal instances within the set of resources.

In some aspects, the base station 105-a may generate the null resource elements within each reference signal instance by modulating the null resource elements by zero. In this regard, the null resource elements within each reference signal may include empty subcarriers in which no data is conveyed. In some cases, the base station 105-a may perform power shifting between the null resource elements and the reference signal resource elements of one or more reference signal instances of the reference signal 220. In particular, the base station 105-a may shift power which would have otherwise been associated with the null resource elements to the reference signal resource elements such that a power of the reference signal resource elements is greater than a power of the null resource elements and/or other resource elements (e.g., data resource elements) within the set of resources.

In some aspects, the null resource elements within each reference signal instance of the reference signal 220 may serve as a guard band to protect against CFO. In particular, by serving as a guard band between the reference signal resource elements of the reference signal 220 and other resource elements (e.g., data resource elements), the null resource elements may enable a certain degree of CFO to take place without detrimentally affecting the reference signal resource elements of the reference signal 220. Accordingly, the inclusion of the null resource elements within each reference signal instance of the reference signal 220 may render the reference signal 220 more robust to CFO, and thereby enable more accurate CFO estimation at the UE 115-a.

In some aspects, the UE 115-a may perform one or more measurements with the reference signal 220. In particular, the UE 115-a may perform one or more measurements based on the set of reference signal instances within the reference signal 220. In this regard, the UE 115-a may perform the one or more measurements based on determining the parameters for communications between the UE 115-a and the base station 105-a, transmitting the request 210 for the pattern of the configuration of the reference signal 220, receiving the first indication of the set of reference signal instances, receiving the second indication of the one or more resource element formats, determining the anchor resource elements, determining the position of each reference signal instance, receiving the reference signal 220, or any combination thereof.

Additionally, the UE 115-a may estimate CFO based on the measurements performed on the received reference signal 220. In some aspects, the UE 115-a may be configured to selectively adjust one or more components and/or communications parameters used to communicate with the base station 105-a based on the estimated CFO. In this regard, the UE 115-a may adjust for the CFO in order to reduce or eliminate the detrimental effects of the estimated CFO. Communications parameters which may be selectively adjusted by the UE 115-a based on the estimated CFO may include, but are not limited to, a local clock used by the UE 115-a, an oscillator used to receive signals from the base station 105-a, a sampling rate, or any combination thereof.

Subsequently, the UE 115-a and the base station 105-a may communicate with one another based on receiving and/or transmitting the reference signals 220, performing the measurements on the reference signals 220, estimating the CFO, selectively adjusting components or communications parameters based on the estimated CFO, or any combination thereof.

Techniques described herein may support improved reference signal patterns which enable improved CFO estimation. By configuring reference signal patterns with null resource elements positioned proximate to reference signal resource elements in the frequency time domain, the techniques described herein may reduce or eliminate interference to the reference signals (e.g., PTRS) which is attributable to CFO. In particular, the null resource elements may separate the reference signal resource elements from other data resource elements within the frequency domain, therefore making the resource elements of the PTRS less susceptible to CFO. In this regard, techniques described herein may provide for reference signal patterns which enable more accurate CFO estimation, thereby enabling the UE 115-a to more accurately compensate for CFO and leading to more efficient and reliable wireless communications within the wireless communications system 200.

Figure 3:
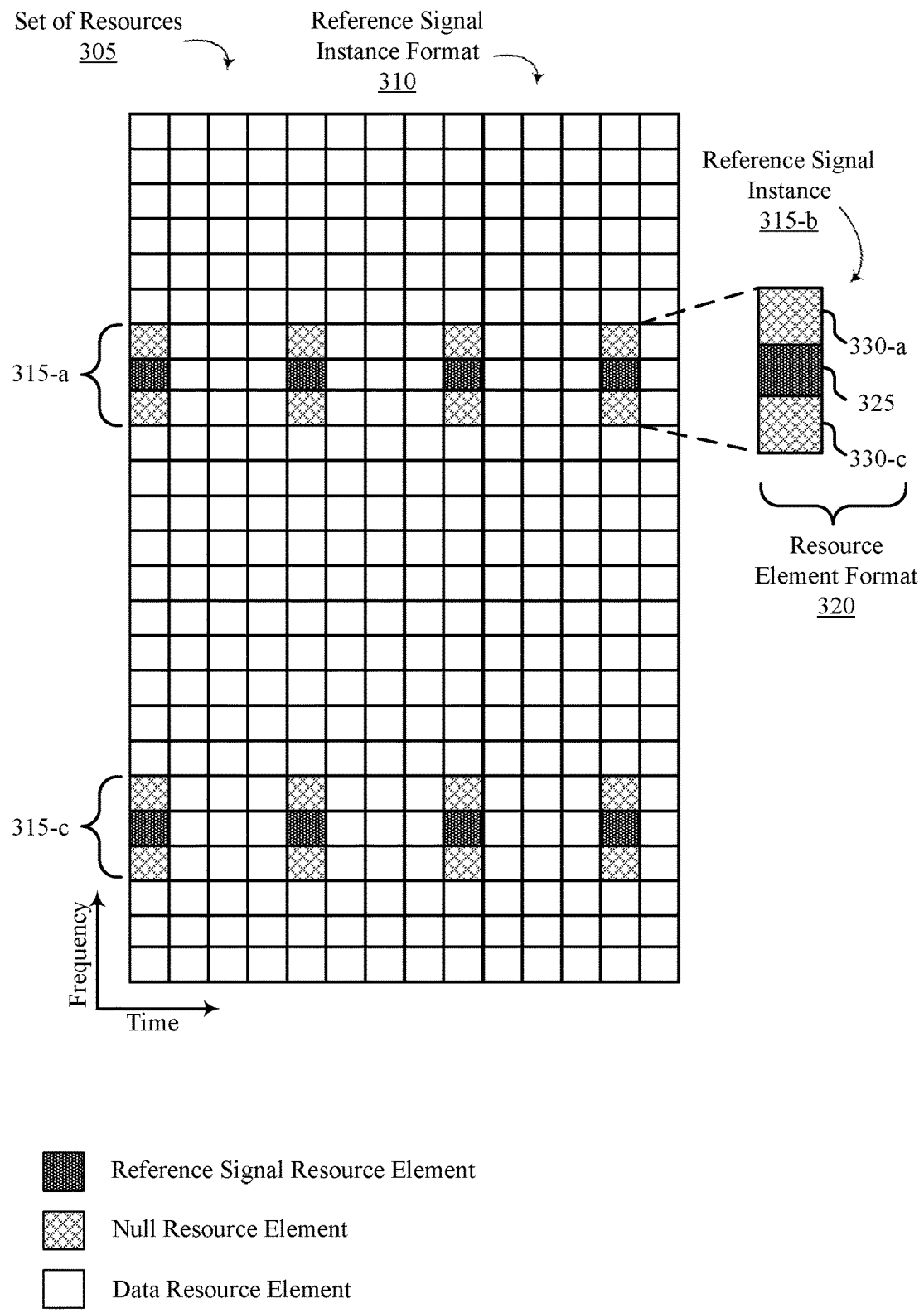
FIG. 3 illustrates an example of a resource allocation scheme that supports techniques for reference signal patterns in accordance with aspects of the present disclosure.

FIG. 3 illustrates an example of a resource allocation scheme 300 that supports techniques for reference signal patterns in accordance with aspects of the present disclosure. In some examples, resource allocation scheme 300 may implement, or be implemented by, aspects of wireless communications system 100, wireless communications system 200, or both. In some aspects, the resource allocation scheme 300 illustrates an improved reference signal pattern for CFO estimation.

In some aspects, a UE 115 may be configured with a set of resources 305. In some aspects, the set of resources 305 may include a set of resources 305 allocated for communications at the UE 115. The set of resources 305 may include a set of time resources, a set of frequency resources, a set of spatial resources, or any combination thereof. In some cases, the set of resources 305 may include a resource block or another unit of resources used for wireless communications. In some aspects, the UE 115 may receive (e.g., from a base station 105) a first indication of a set of reference signal instances 315 (e.g., a first indication of a reference signal instance format 310), a second indication of one or more resource element formats 320, or both. As noted previously herein, the first indication of the set of reference signal instances 315 may include an indication of a reference signal instance format 310, where the reference signal instance format 310 indicates a position of each reference signal instance 315 of the set of reference signal instances 315 within the set of resources 305.

For example, the first indication of the set of reference signal instances 315 may include the reference signal instance format 310 which may be used to determine a position of each reference signal instance 315 (e.g., reference signal instances 315-a, 315-b, and 315-c). For the purposes of simplicity, only a subset of the reference signal instances 315 are labeled with reference numbers.

In some aspects, the first indication of the set of reference signal instances 315 (e.g., reference signal instance format 310) may include an indication of one or more parameters which may be used to determine the relative position of each reference signal instance 315 of the set of reference signal instances 315 within the set of resources 305. For example, the first indication may include a time density indicator associated with the set of reference signal instances 315, a frequency density indicator associated with the set of reference signal instances 315, a resource element offset indicator associated with the set of reference signal instances 315, a symbol offset indicator associated with the set of reference signal instances 315, or any combination thereof.

The time density indicator may indicate a quantity of reference signal instances 315 per symbol within the set of resources 305, and the frequency density indicator may indicate a quantity of reference signal instances 315 per resource block within the set of resources 305. In this regard, the time density indicator may indicate a density of reference signal instances 315 in the time domain (e.g., along a horizontal axis in FIG. 3), whereas the frequency density indicator may indicate a density of reference signal instances 315 in the frequency domain (e.g., along a vertical axis in FIG. 3). Moreover, the resource element offset indicator may indicate a first offset in the frequency domain of the set of reference signal instances 315 relative to a first boundary of the set of resources 305, and the symbol offset indicator indicates a second offset in the time domain of the set of reference signal instances 315 relative to a second boundary of the set of resources 305. For example, the resource element offset may indicate a first offset of the reference signal instance 315-c relative to a lower frequency boundary of the set of resources 305 (e.g., relative to the bottom, horizontal boundary of the set of resources 305), and the symbol offset indicator may indicate a second offset of the reference signal instance 315-c relative to a boundary associated with an initial time of the set of resources 305 (e.g., relative to the left, vertical boundary of the set of resources 305).

In some aspects, the one or more resource element formats 320 indicated in the second indication may indicate configurations, formats, or arrangements of resource elements 325, 330 within each respective reference signal instance 315. As noted previously herein, the resource element formats 320 may include one or more reference signal resource elements 325 and null resource elements 330 for each reference signal instance 315. For example, the reference signal instance 315-b illustrated in FIG. 3 may be defined by the resource element format 320 including a reference signal resource element 325, a first null resource element 330-a, and a second null resource element 330-b. A null resource element 330 may be a resource element 330 that does not carry a signal or information or may carry a predetermined signal or information. In some cases, a null resource element 330 may be an example of a guard resource element that protects a reference signal resource element 325 from interference in the frequency domain from other resource elements that carry data or other information.

In some aspects, as shown in FIG. 3, the null resource elements 330-a and 330-b may be positioned between the reference signal resource element 325 and other resource elements used for other information (e.g., data resource elements) in the time domain. In this regard, the null resource elements 330 may serve as a guard band between the reference signal resource element 325 and the data resource elements within the set of resources 305 in order to guard against CFO.

In some aspects, each reference signal instance 315 within a reference signal instance format 310 may be associated with a single resource element format 320. For example, as shown in FIG. 3, each reference signal instance 315 may be associated with a single resource element format 320 such that each reference signal instance 315 is identical. In some aspects, the resource element format may be configured such that the reference signal instances 315 associated with the resource element format 320 are symmetrical in the time domain, the frequency domain, or both. Moreover, each reference signal instance 315 may span one resource element in the time domain, and may span three or more resource elements in the frequency domain. In some aspects, the resource elements of each reference signal instance may be contiguous in the frequency domain.

In some aspects, the UE 115 may determine the position of each reference signal instance 315 based on determining an anchor resource element associated with each reference signal instance 315 of the set of reference signal instances 315. In some aspects, the anchor resource element for each reference signal instance 315 may be indicated via the first indication of the set of reference signal instances 315 (e.g., the reference signal instance format 310), the second indication of the one or more resource element formats 320, or both. By way of example, the first indication of the set of reference signal instances 315 and/or the second indication of the one or more resource element formats 320 may indicate that the reference signal resource element 325 of each respective reference signal instance 315 includes the anchor resource element for the respective reference signal instance 315. However, it is noted herein that any resource element 325, 330 of the respective reference signal instances 315 may serve as the anchor resource element for the respective reference signal instances 315.

In some aspects, the UE 115 may determine a position of each reference signal instance 315 of the set of reference signal instances 315 based on the determined anchor resource elements, the first indication of the set of reference signal instances 315 (e.g., reference signal instance format 310), the second indication of the one or more resource element formats 320, or any combination thereof. In particular, the UE 115 may determine the position of each reference signal instance 315 within the set of resources 305 based on the determined anchor resource elements and the one or more received indications associated with the position of the reference signal instances 315 (e.g., time density indicator, frequency density indicator, resource element offset indicator, symbol offset indicator).

For example, the first indication of the set of reference signal instances 315 may include an indication of one or more parameters and/or characteristics which may be used to determine the position of the reference signal instances 315 including the time density indicator, the frequency density indicator, the resource element offset indicator, the symbol offset indicator, or any combination thereof. In this example, the UE 115 may determine the position of each reference signal instance 315 within the set of resources 305 by applying the received indicators to the determined anchor resource elements associated with each reference signal instance 315. In this regard, the received indicators (e.g., time density indicator, frequency density indicator, resource element offset indicator, symbol offset indicator) may be defined relative to the anchor resource elements of the reference signal instances 315.

Upon determining the position of each reference signal instance 315, the UE 115 may receive a reference signal (e.g., PTRS) which is transmitted according to the determined reference signal instance format(s) 310 and/or resource element format(s) 320. In this regard, the UE 115 may monitor the determined positions of the reference signal instances 315 in order to receive the reference signal, perform measurements on the received reference signal, and estimate CFO based on the performed measurements.

In some cases, as noted previously herein, the base station 105 may generate the null resource elements 330 within each reference signal instance 315 by modulating the null resource elements 330 by zero. In this regard, the null resource elements 330 may include empty subcarriers in which no data is conveyed. Additionally, the base station 105 may perform power shifting between the null resource elements 330 and the reference signal resource elements 325 of one or more reference signal instances 315 of the reference signal. In particular, the base station 105 may shift power which would have otherwise been associated with the null resource elements 330 to the reference signal resource elements 325 such that a power of the reference signal resource elements 325 is greater than a power of the null resource elements 330 and/or other resource elements (e.g., data resource elements) within the set of resources 305. For example, the base station 105 may shift power from the null resource elements 330-a and 330-b of the reference signal instance 315 to the reference signal resource element 325 such that a power of the reference signal resource element 325 is greater than a power of the null resource elements 330-a, 330-b, the surrounding data resource elements, or both. In some cases, performing power shifting according to techniques described herein may further improve the efficiency of the reference signals (e.g., PTRS), improve a resilience of the reference signal to CFO, and improve a capability of the UE 115 to estimate CFO using the reference signal.

Figure 4:
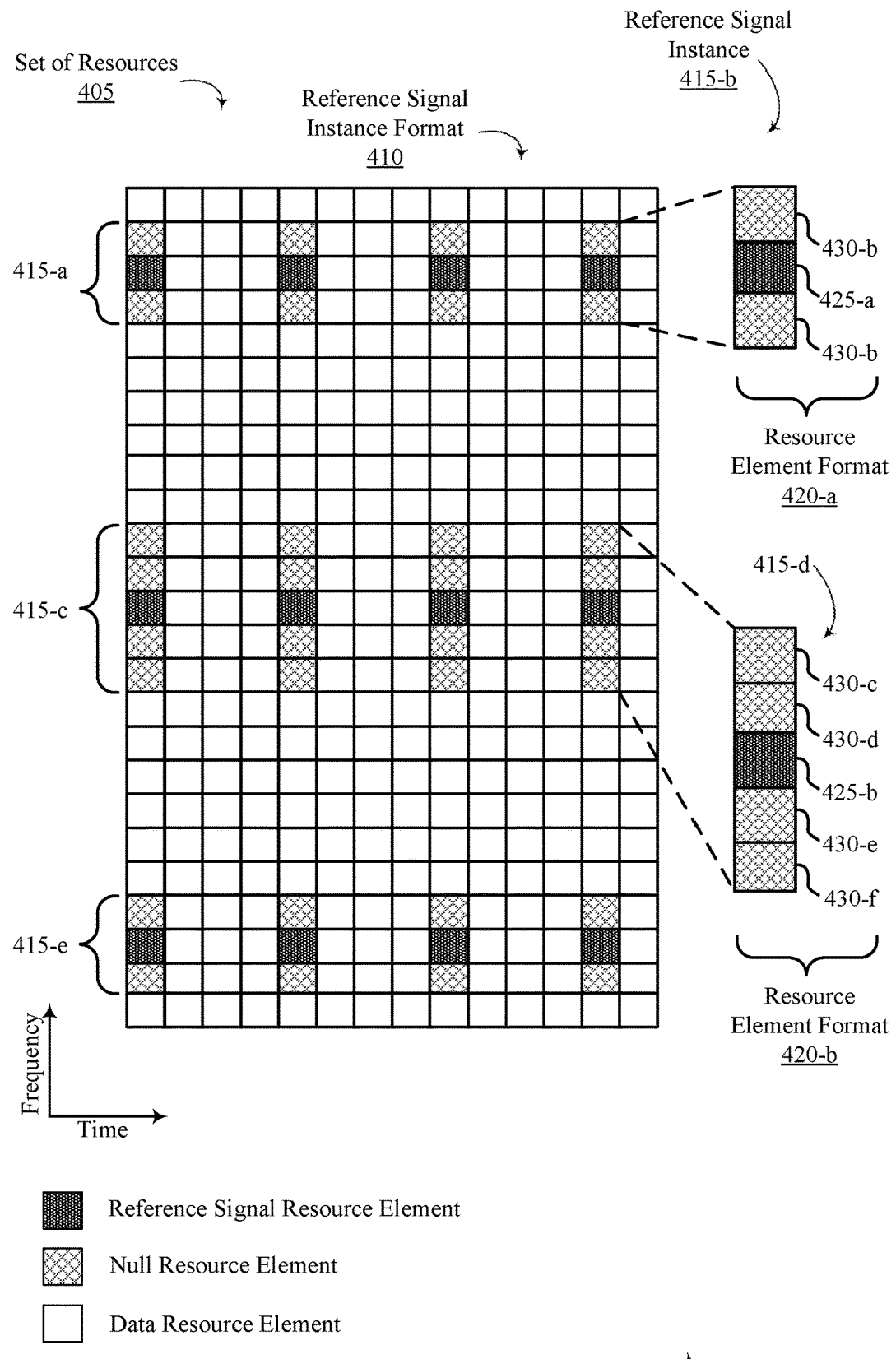
FIG. 4 illustrates an example of a resource allocation scheme that supports techniques for reference signal patterns in accordance with aspects of the present disclosure.

FIG. 4 illustrates an example of a resource allocation scheme 400 that supports techniques for reference signal patterns in accordance with aspects of the present disclosure. In some examples, resource allocation scheme 400 may implement, or be implemented by, aspects of wireless communications system 100, wireless communications system 200, or both. In some aspects, the resource allocation scheme 400 illustrates an improved reference signal pattern for CFO estimation.

It is noted herein that any discussion regarding the resource allocation scheme 300 illustrated in FIG. 3 may be regarded as applying to the resource allocation scheme 400 illustrated in FIG. 4, unless noted otherwise herein. In this regard, a UE 115 may be configured to determine a set of resources 405, receive a first indication of a set of reference signal instances 415 (e.g., indication of a reference signal instance format 410), and a second indication of one or more resource element formats 420. The UE 115 may be configured to determine a position of each reference signal instance 415 by determining anchor resource elements of each reference signal instance 415, and indicators associated with the position of the reference signal instances 415 (e.g., time density indicator, frequency density indicator, resource element offset indicator, symbol offset indicator).

Compared to resource allocation scheme 300 illustrated in FIG. 3 in which each reference signal instance 315 is associated with a single resource element format 320, the reference signal instances 415 of the resource allocation scheme 400 illustrated in FIG. 4 may be associated with multiple resource element formats 420. For example, the reference signal instances 415-a, 415-b, and 415-e may be associated with a first resource element format 420-a, and the reference signal instances 415-c and 415-d may be associated with a second resource element format 420-b different from the first resource element format 420-a.

In some aspects, both the first and second resource element formats 420-a and 420-b may include one or more reference signal resource elements 425 and one or more null resource elements 430 for each reference signal instance 415. For example, the reference signal instance 415-b illustrated in FIG. 4 may be defined by the first resource element format 420-a including a reference signal resource element 425-a, a first null resource element 430-a, and a second null resource element 430-b.

By way of another example, the reference signal instance 415-d illustrated in FIG. 4 may be defined by the second resource element format 420-b including a reference signal resource element 425-b, a first null resource element 430-c, a second null resource element 430-d, a third null resource element 430-e, and a fourth null resource element 430-f. In this regard, the second resource element format 420-b may include multiple the null resource elements 430 positioned between the reference signal resource element 425-b and other resource elements (e.g., data resource elements) in the frequency domain. The multiple null resource elements 430 on each side of the reference signal resource element 425-b may serve as a guard band to provide improved protection and resiliency of the reference signal against CFO.

Figure 5:
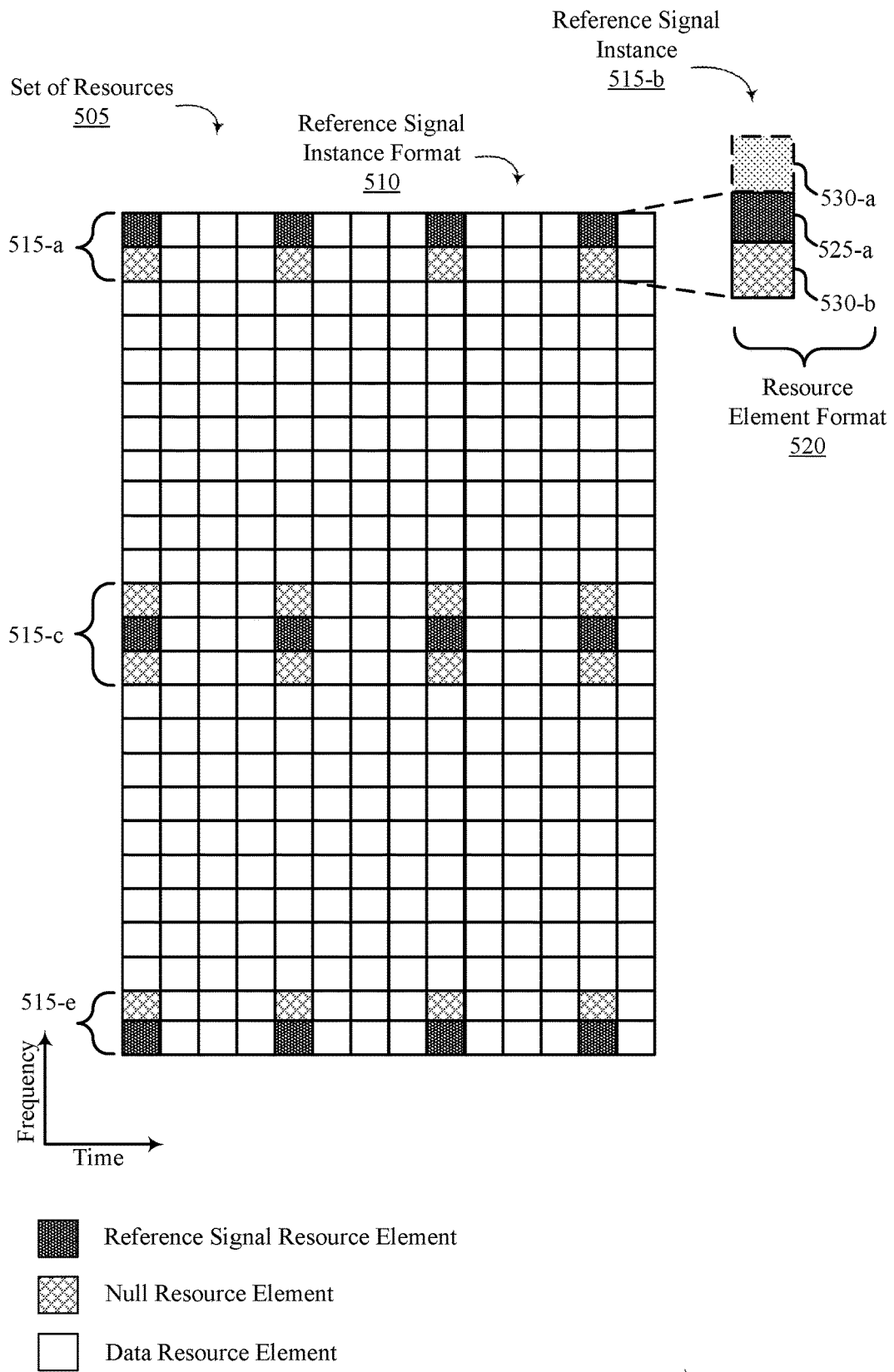
FIG. 5 illustrates an example of a resource allocation scheme that supports techniques for reference signal patterns in accordance with aspects of the present disclosure.

FIG. 5 illustrates an example of a resource allocation scheme 500 that supports techniques for reference signal patterns in accordance with aspects of the present disclosure. In some examples, resource allocation scheme 500 may implement, or be implemented by, aspects of wireless communications system 100, wireless communications system 200, or both. In some aspects, the resource allocation scheme 500 illustrates an improved reference signal pattern for CFO estimation.

It is noted herein that any discussion regarding the resource allocation schemes 300 and/or 400 illustrated in FIGS. 3-4 may be regarded as applying to the resource allocation scheme 500 illustrated in FIG. 5, unless noted otherwise herein. In this regard, a UE 115 may be configured to determine a set of resources 505, receive a first indication of a set of reference signal instances 515 (e.g., indication of a reference signal instance format 510), and a second indication of one or more resource element formats 520. The UE 115 may be configured to determine a position of each reference signal instance 515 by determining anchor resource elements of each reference signal instance 515, and indicators associated with the position of the reference signal instances 515 (e.g., time density indicator, frequency density indicator, resource element offset indicator, symbol offset indicator).

In some aspects, one or more reference signal instances 515 may be positioned at and/or across a boundary of the set of resources 505. For example, the reference signal instances 515-a and 515-b illustrated in FIG. 5 may be positioned at an upper frequency boundary of the set of resources 505, and the reference signal instance 515-e may be positioned at a lower frequency boundary of the set of resources 505. In some cases where reference signal instances 515 are positioned at and/or across a boundary of the set of resources 505, one or more null resource elements 530 of the one or more reference signal instances 515 may be omitted from the reference signal instances 515. For example, as shown in FIG. 5, a null resource element 530-a may be omitted from the reference signal instance 515-b due to the fact that the reference signal instance 515-b is positioned at (e.g., across) the upper frequency boundary of the set of resources 505. In some aspects, null resource elements 530 may be omitted from reference signal instances 515 based on the reference signal instance format 510 and the relative position of the one or more reference signal instances 515 (e.g., reference signal instance 515-b) relative to the boundary of the set of resources 505.

It is noted herein that positioning one or more reference signal instances 515 at and/or across a boundary of the set of resources 505 allocated for the UE 115 may further improve an efficiency of reference signals when estimating CFO. In particular, the one or more reference signal instances 515 positioned at and/or across a boundary of the set of resources 505 may be even less susceptible to CFO, as the UE 115 may not be configured to receive signals above the upper frequency boundary and below the lower frequency boundary. In this regard, the one or more reference signal instances 515 positioned at and/or across a boundary of the set of resources 505 may be susceptible to CFO in one direction within the frequency domain.

Figure 6:
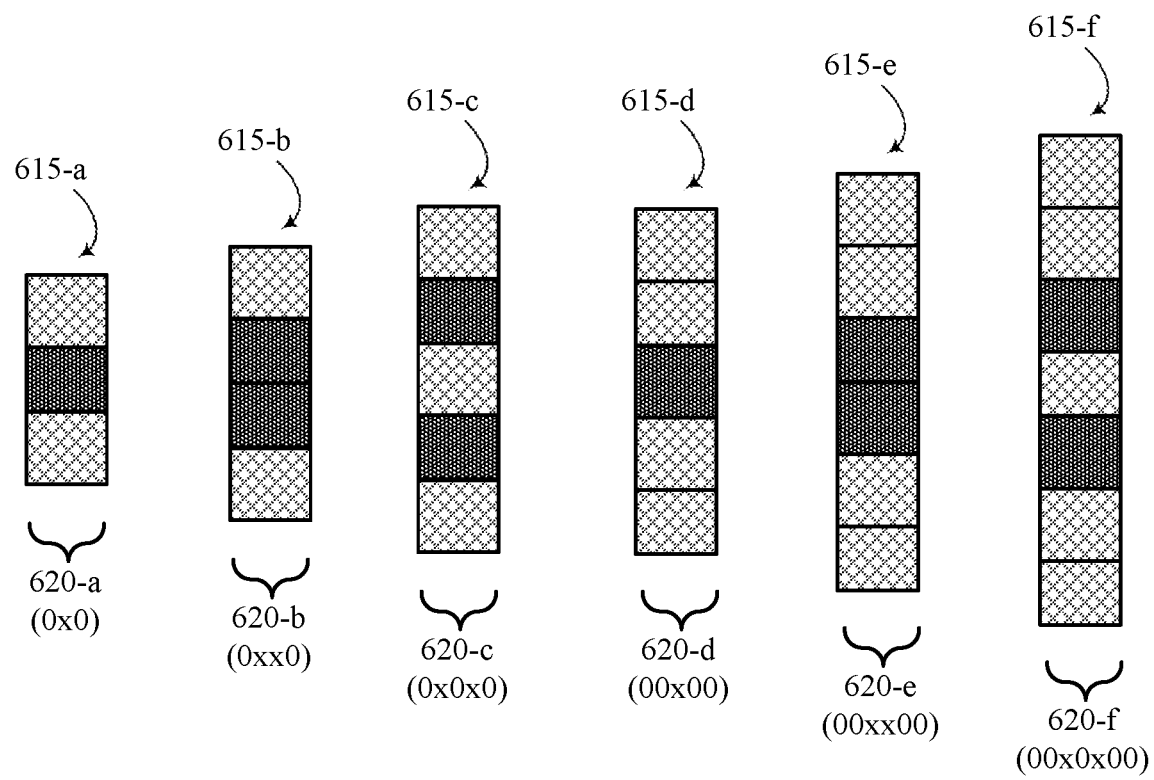
FIG. 6 illustrates an example of a resource allocation scheme that supports techniques for reference signal patterns in accordance with aspects of the present disclosure.

FIG. 6 illustrates an example of a resource allocation scheme 600 that supports techniques for reference signal patterns in accordance with aspects of the present disclosure. In some examples, resource allocation scheme 600 may implement, or be implemented by, aspects of wireless communications system 100, wireless communications system 200, or both. In some aspects, the resource allocation scheme 600 illustrates an improved reference signal pattern for CFO estimation.

In particular, the resource allocation scheme 600 illustrated in FIG. 5 illustrate various resource element formats 620 which may be used to define formats of resource elements within reference signal instances 615. The resource allocation scheme 600 illustrates a first resource element format 620-a, a second resource element format 620-b, a third resource element format 620-c, a fourth resource element format 620-d, fifth resource element format 620-e, and a sixth resource element format 620-f. In some cases, the respective resource element formats 620 may be defined or characterized by sequences of "0's" and "x's," where a "0" indicates a null resource element, and an "x" indicates a reference signal resource element. For example, the first resource element format 620-a may be represented by the sequence "0x0," and the sixth resource element format 620-f may be represented by the sequence "00x0x00."

In some aspects, each of the resource element formats 620 may define formats and/or configurations of reference signal instances 615 such that the respective reference signal instances 615 are symmetrical in the time domain, the frequency domain, or both. Moreover, each of the resource element formats 620 may define formats and/or configurations of reference signal instances 615 such that the respective reference signal instances 615 may span one resource element in the time domain, and may span three or more resource elements in the frequency domain. In some aspects, the resource elements 625, 630 of each reference signal instance may be contiguous in the frequency domain.

In some cases, some resource element formats 620 may include and/or define a first reference signal resource element, a second reference signal resource element, and one or more null resource elements positioned between the first reference signal resource element and the second reference signal resource element in the frequency domain. For example, the third resource element format 620-*c* and the sixth resource element format 620-*f* may each include a first reference signal resource element, a second reference signal resource element, and one or more null resource elements positioned between the first reference signal resource element and the second reference signal resource element in the frequency domain. By way of another example, the second resource element format 620-*b* and the fifth resource element format 620-*e* may include a first reference signal resource element and a second reference signal resource element adjacent to the first reference signal resource element in the frequency domain.

In some aspects, reference signal instances (e.g., reference signal instances 315, 415, 515, 615) of reference signal instance formats may be associated with one or multiple resource element formats 620. Moreover, it is noted herein that the resource element formats 620 illustrated in FIG. 6 are provided solely for illustrative purposes. In this regard, it is contemplated herein that additional or alternative resource element formats 620 may be used without departing from the spirit and scope of the present disclosure.

Figure 7:
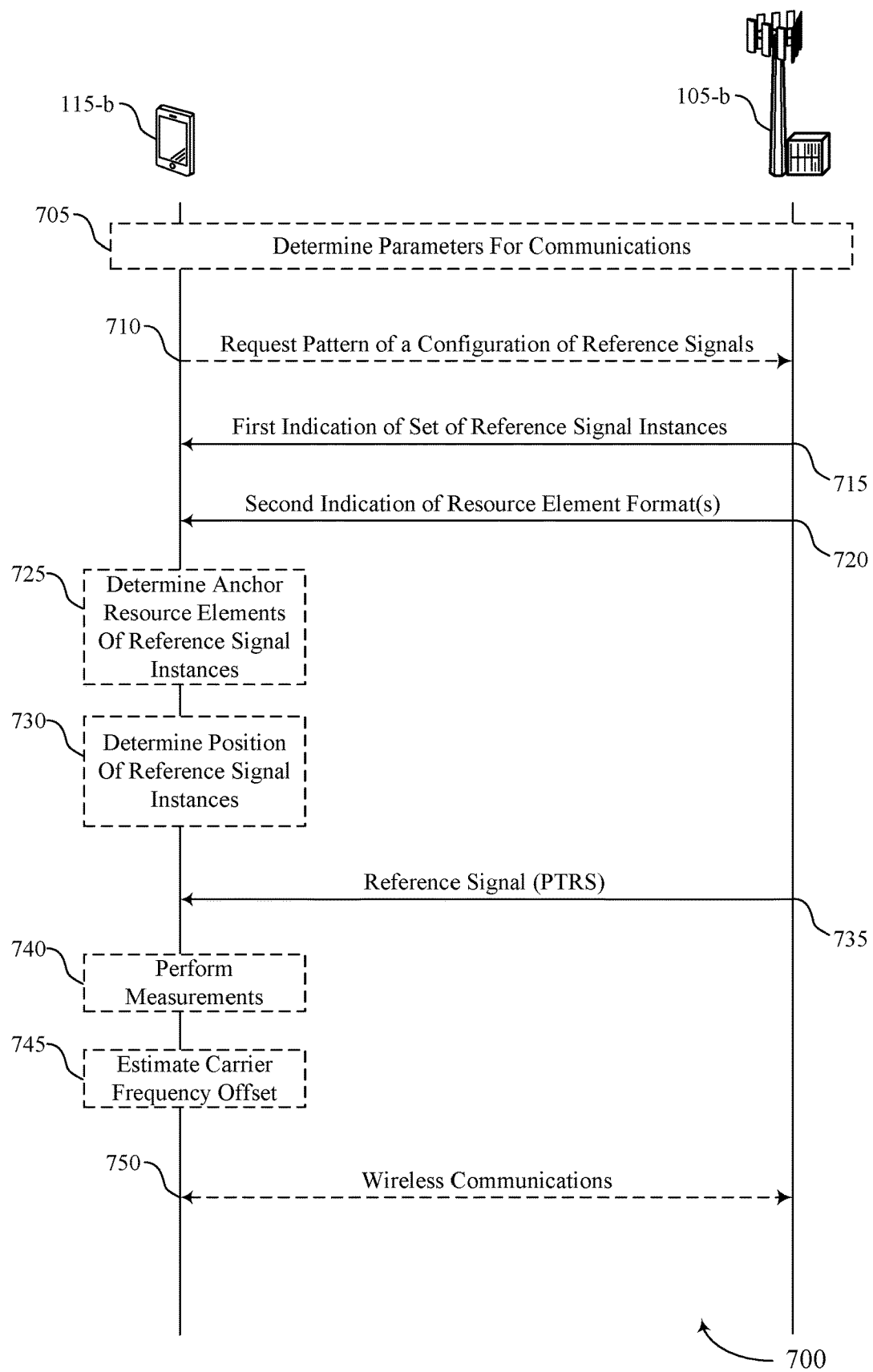
FIG. 7 illustrates an example of a resource allocation scheme that supports techniques for reference signal patterns in accordance with aspects of the present disclosure.

FIG. 7 illustrates an example of a process flow 700 that supports techniques for reference signal patterns in accordance with aspects of the present disclosure. In some examples, process flow 700 implement, or be implemented by, aspects of wireless communications system 100, wireless communications system 200, resource allocation schemes 300, 400, 500, 600, or any combination thereof. For example, the process flow 700 may illustrate a UE 115-*b* receiving a first indication of a set of reference signal instances, receiving a second indication of a resource element format, receiving a reference signal based on the first indication and the second indication, and communicating with a base station 105-*b* based on the received reference signal, as described with reference to FIGS. 1-6, among other aspects. The process flow 700 may include a UE 115-*b* and a base station 105-*b*, which may be examples of UEs 115 and base stations 105, as described with reference to FIGS. 1-6.

In some examples, the operations illustrated in process flow 700 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

The techniques of process flow 700 are shown and described as being carried out in the context of a terrestrial network between the UE 115-*b* and the base station 105-*b*. However, this is not to be regarded as a limitation of the present disclosure, unless noted otherwise herein. In this regard, the communications shown and described in FIG. 6 may additionally or alternatively be carried out in the context of an NTN between the UE 115-*b* and a satellite 120.

At 705, the UE 115-*b*, the base station 105-*b*, or both, may determine one or more parameters associated with communications between the UE 115-*b* and the base station 105-*b*. In this regard, the UE 115-*b* may determine one or more parameters associated with communications between the UE 115-*b* and the base station 105-*b* over a set of resources (e.g., time resources, frequency resources). The one or more parameters may include, but are not limited to, an MCS, an expected and/or estimated CFO expected to be experienced at the UE 115-*b*, a BLER determined by the UE 115-*b*, a frequency density and/or time density associated with the set of resources allocated for communications at the UE 115-*b*, available overhead within the set of resources allocated for communications at the UE 115-*b* which may be used for a set of reference signal instances associated with a reference signal (e.g., what percentage of resources may be allocated for reference signals), or any combination thereof. In some aspects, the UE 115-*b* and/or the base station 105-*b* may determine the one or more parameters by performing measurements on signals (e.g., reference signals) received from the other device.

At 710, the UE 115-*b* may transmit a request for a pattern of a configuration for reference signals associated with measuring CFO (e.g., request for reference signal instance format(s) and/or resource element format(s)). In some aspects, the UE 115-*b* may transmit the request for the pattern of the configuration for reference signals (e.g., PTRS pattern) based on determining the one or more parameters at 705. In some aspects, the request may include an indication of the one or more parameters determined at 705. The request may be transmitted via a MAC-CE message, a CSI-feedback message, an RRC message, or any combination thereof. In this regard, the request may be transmitted via PUCCH and/or PUSCH.

At 715, the UE 115-*b* may receive a first indication of a set of reference signal instances within the set of resources allocated for communications at the UE 115-*b*. In some aspects, the first indication of the set of reference signal instances may include an indication of a reference signal instance format. In some aspects, each reference signal instance format may be used indicate or determine the relative position of reference signal instances associated with a reference signal (e.g., PTRS) within a set of resources. In some aspects, the UE 115-*b* may receive and/or determine the first indication of the set of reference signal instances based on determining the parameters for communications between the UE 115-*b* and the base station 105-*b* at 705, transmitting the request at 710, or both. In some aspects, the UE 115-*b* may receive the first indication of the set of reference signal instances via control signaling (e.g., RRC signaling, SIB signaling, MAC-CE messaging, DCI messaging).

In some aspects, the first indication of the set of reference signal instances may include an indication of one or more parameters which may be used to determine the relative position of each reference signal instance of the set of reference signal instances within the set of resources allocated for the UE 115-*b*. For example, the first indication may include a time density indicator associated with the set of reference signal instances, a frequency density indicator associated with the set of reference signal instances, a resource element offset indicator associated with the set of reference signal instances, a symbol offset indicator associated with the set of reference signal instances, or any combination thereof.

At 720, the UE 115-*b* may receive a second indication of one or more resource element formats associated with at least one reference signal instance of the set of reference signal instances received/determined at 715. In some aspects, the one or more resource element formats may be used to determine a configuration and/or format of resource elements within the at least one reference signal instance. In some aspects, the UE 115-*b* may receive and/or determine the second indication of the resource element format based on determining the parameters for communications between the UE 115-*b* and the base station 105-*b* at 705, transmitting the request at 710, receiving the first indication of the set of reference signal instances at 715, or any combination thereof.

For example, as noted previously herein, the UE 115-*b* may receive an indication of a set of resource element formats via a first control message (e.g., RRC message, SIB message), and may subsequently receive an indication of one or more resource element formats within the set of resource element formats which are to be used by the UE 115-*b*. In this regard, the UE 115-*b* may receive and/or determine the second indication of the resource element format(s) based on the first control message and/or the second control message. It may be appreciated herein that, in some cases, the first indication of the set of reference signal instances and the second indication of the resource element format may be received from the base station 105-*b* via the same or different signaling.

In some aspects, each resource element format may include one or more null resource elements and one or more reference signal resource elements. In this regard, each reference signal instance associated with the resource element format received via the second indication may include one or more null resource elements and one or more reference signal resource elements. In some aspects, the resource element format may be configured such that the reference signal instances associated with the resource element format are symmetrical in the frequency domain. Moreover, each reference signal instance may span one resource element in the time domain, and may span three or more resource elements in the frequency domain.

In some cases, one or more reference signal instances may be positioned at and/or across a boundary of the set of resources allocated for communications at the UE 115-*b*. In such cases, one or more null resource elements of the one or more reference signal instances may be omitted based on the resource element format and the relative position of the one or more reference signal instances relative to the boundary of the set of resources.

At 725, the UE 115-*b* may determine an anchor resource element associated with each reference signal instance of the set of reference signal instances. The anchor resource element may be used to determine the relative position of each reference signal instance of the set of reference signal instances within the set of resources allocated for communications at the UE 115-*b*. In this regard, the UE 115-*b* may determine the anchor resource element associated with each reference signal instance based on receiving the first indication of the set of reference signal instances (e.g., reference signal instance format) at 715, receiving the second indication of the one or more resource element formats at 720, or both. For example, the UE 115-*b* may determine the anchor resource element associated with each reference signal instance based on control signaling received from the base station 105-*b* (e.g., RRC signaling, SIB signaling, MAC-CE messaging, DCI messaging).

At 730, the UE 115-*b* may determine a position of each reference signal instance of the set of reference signal instances. In some aspects, the UE 115-*b* may determine position of each reference signal instance of the set of reference signal instances based on receiving the first indication of the set of reference signal instances (e.g., reference signal instance format) at 715, receiving the second indication of the one or more resource element formats at 720, determining the anchor resource elements of each reference signal instance at 725, or any combination thereof.

For example, the first indication of the set of reference signal instances may include an indication of one or more parameters and/or characteristics which may be used to determine the position of the reference signal instances. For instance, the first indication of the set of reference signal instances may include an indication of a time density indicator associated with the set of reference signal instances, a frequency density indicator associated with the set of reference signal instances, a resource element offset indicator associated with the set of reference signal instances, a symbol offset indicator associated with the set of reference signal instances, or any combination thereof. In this example, the UE 115-*b* may determine the position of each reference signal instance within the set of resources allocated for the UE 115-*b* based on the anchor resource element associated with each reference signal instance, the time density indicator, the frequency density indicator, the resource element offset indicator, the symbol offset indicator, or any combination thereof. In some aspects, the received indicators (e.g., time density indicator, frequency density indicator, resource element offset indicator, symbol offset indicator) may be defined relative to the anchor resource elements of the reference signal instances. Accordingly, the UE 115-*b* may be configured to determine the position of reference signal instances by applying the received indicators (e.g., time density indicator, frequency density indicator, resource element offset indicator, symbol offset indicator) to each anchor resource element associated with each reference signal instance.

At 735, the UE 115-*b* may receive a reference signal from the base station 105-*b*. In some aspects, the reference signal may be configured for estimating CFO. In this regard, the reference signal may include, but is not limited to, a PTRS. In some aspects, the UE 115-*b* may receive the reference signal at 745 based on determining the parameters for communications at 705, transmitting the request for the pattern of the configuration of the reference signal at 710, receiving the first indication of the set of reference signal instances at 715, receiving the second indication of the one or more resource element formats at 720, determining the anchor resource elements at 725, determining the position of each reference signal instance at 730, or any combination thereof. For example, the base station 105-*b* may transmit the reference signal (e.g., PTRS) at 735 based on a reference signal instance format indicated in the first indication transmitted at 715, based on the one or more resource element formats indicated in the second indication transmitted at 720, or both. In some aspects, the UE 115-*b* may receive the reference signal by monitoring the positions of the reference signal instances determined at 730 within the set of resources allocated for communications at the UE 115-*b*.

As noted previously herein, each reference signal instance within the reference signal may include one or more null resource element and one or more reference signal resource elements. In some aspects, the null resource elements within each reference signal instance of the reference signal may serve as a guard band to protect against CFO. In particular, by serving as a guard band between the reference signal resource elements of the reference signal and other resource elements (e.g., data resource elements), the null resource elements may enable a certain degree of CFO to take place without detrimentally affecting the reference signal resource elements of the reference signal. Accordingly, the inclusion of the null resource elements within each reference signal instance of the reference signal may render the reference signal transmitted at 735 more robust to CFO, and thereby enable more accurate CFO estimation.

In some aspects, the base station 105-*b* may generate the null resource elements within each reference signal instance by modulating the null resource elements by zero. In this regard, the null resource elements 330 may include empty subcarriers in which no data is conveyed. In some cases, the base station 105-*b* may perform power shifting between the null resource elements and the reference signal resource elements of one or more reference signal instances of the reference signal. In particular, the base station 105-*b* may shift power which would have been associated with the null resource elements to the reference signal resource elements such that a power of the reference signal resource elements is greater than a power of the null resource elements and/or other resource elements (e.g., data resource elements) within the set of resources allocated for communications at the UE 115-*b*.

At 740, the UE 115-*b* may perform one or more measurements with the reference signal received at 735. In particular, the UE 115-*b* may perform one or more measurements based on the set of reference signal instances. In this regard, the UE 115-*b* may perform the one or more measurements based on determining the parameters for communications at 705, transmitting the request for the pattern of the configuration of the reference signal at 710, receiving the first indication of the set of reference signal instances at 715, receiving the second indication of the one or more resource element formats at 720, determining the anchor resource elements at 725, determining the position of each reference signal instance at 730, receiving the reference signal at 735, or any combination thereof.

At 745, the UE 115-*b* may estimate the CFO. In some aspects, the UE 115-*b* may estimate the CFO based on the measurements performed at 740. In some aspects, the UE 115-*b* may be configured to selectively adjust one or more components and/or communications parameters used to communicate with the base station 105-*b* based on the estimated CFO. In this regard, the UE 115-*b* may adjust for the CFO in order to reduce or eliminate the detrimental effects of the estimated CFO. Communications parameters which may be selectively adjusted by the UE 115-*b* based on the estimated CFO may include, but are not limited to, a local clock used by the UE 115-*b*, an oscillator used to receive signals from the base station 105-*b*, a sampling rate, or any combination thereof.

At 750, the UE 115-*b* and the base station 105-*b* may communicate with one another. In some aspects, the UE 115-*b* and the base station 105-*b* may communicate with one another based on receiving and/or transmitting the reference signals at 735, performing the measurements at 740, estimating the CFO at 745, selectively adjusting components or communications parameters based on the estimated CFO, or any combination thereof.

Techniques described herein may support improved reference signal patterns which enable improved CFO estimation. By configuring reference signal patterns with null resource elements positioned proximate to reference signal resource elements in the frequency domain, the techniques described herein may reduce or eliminate interference of the reference signals (e.g., PTRS) which is attributable to CFO. In particular, the null resource elements may separate the reference signal resource elements from other data resource elements within the frequency domain, therefore making the resource elements of the PTRS less susceptible to CFO. In this regard, techniques described herein may provide for reference signal patterns which enable more accurate CFO estimation, thereby enabling the UE 115-*b* to more accurately compensate for CFO and leading to more efficient and reliable wireless communications within a wireless communications system (e.g., wireless communications system 100 or 200).

Figure 8:
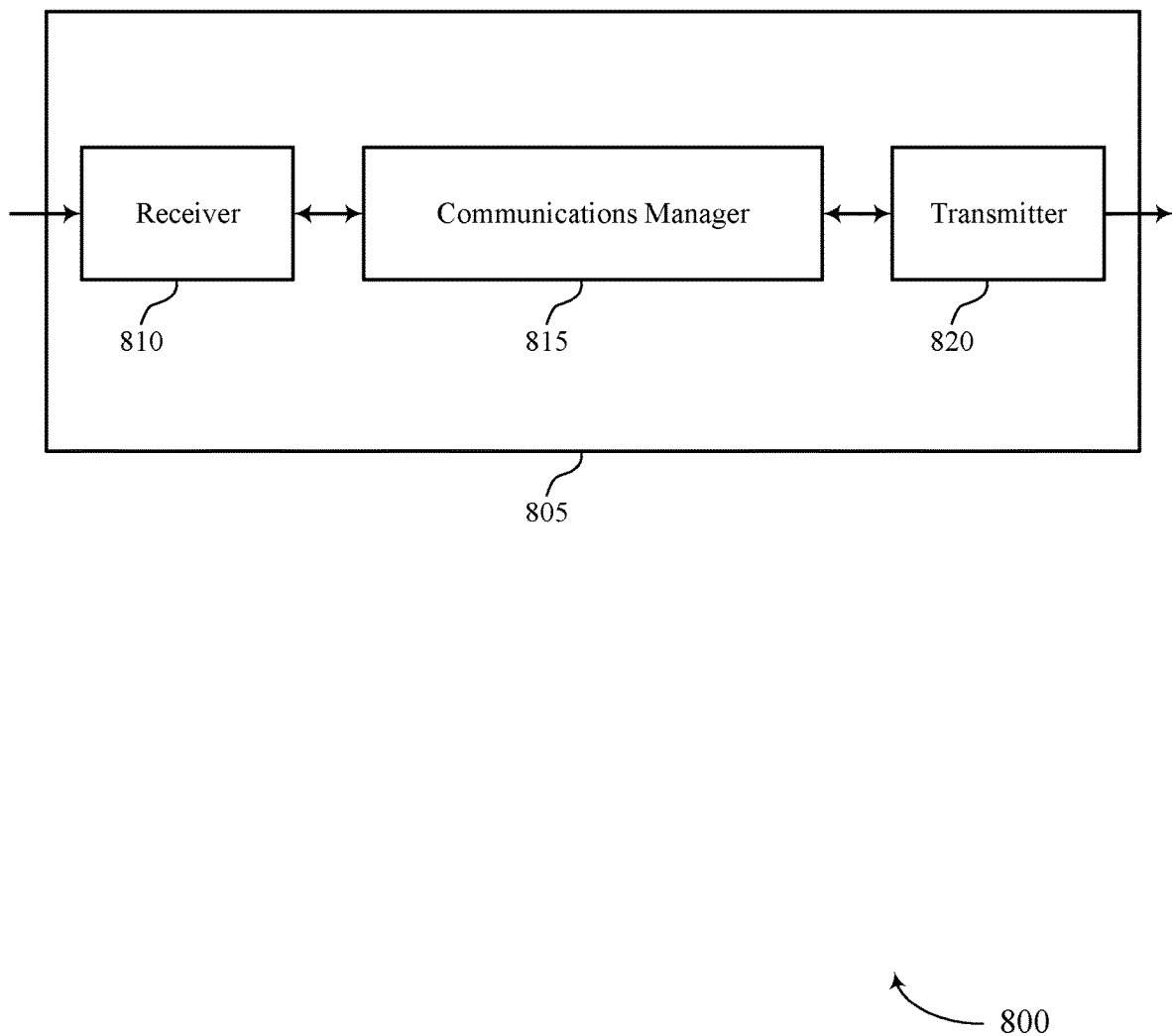
FIGS. 8 and 9 show block diagrams of devices that support techniques for reference signal patterns in accordance with aspects of the present disclosure.

FIG. 8 shows a block diagram 800 of a device 805 that supports techniques for reference signal patterns in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for reference signal patterns, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a first indication of a set of reference signal instances within a set of resources, receive a second indication of a resource element format of a reference signal instance of the set of reference signal instances, the resource element format including one or more null resource elements and one or more reference signal resource elements, receive, from a base station, a reference signal for estimating CFO based on the first indication of the set of reference signal instances and the second indication of the resource element format of the reference signal instance, and communicate with the base station based on receiving the reference signal. The communications manager 815 may be an example of aspects of the communications manager 1110 described herein.

The actions performed by the communications manager 815 as described herein may be implemented to realize one or more potential advantages. For example, by providing for improved reference signal formats, techniques described herein may enable reference signals which are less susceptible to CFO, which may thereby improve CFO estimation at the UE 115. By improving the efficiency and accuracy of CFO estimation, techniques described herein may enable the communications manager 815 to more accurately compensate for estimated CFO, thereby improving the efficiency and reliability of wireless communications.

Based on providing more accurate CFO estimation, a processor of the UE 115 (e.g., a processor controlling the receiver 810, the communications manager 815, the transmitter 820, etc.) may reduce processing resources used for downlink communications. For example, by improving CFO estimation, the UE 115 may be able to more accurately compensate for estimated CFO, which may improve the efficiency and reliability of wireless communications. Moreover, by improving CFO estimation and compensation for CFO, techniques described herein may reduce the number of retransmissions used to successfully receive downlink information at a UE 115 and/or transmit uplink information, correspondingly reducing a number of times the processor ramps up processing power and turns on processing units to handle downlink reception and uplink transmission.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
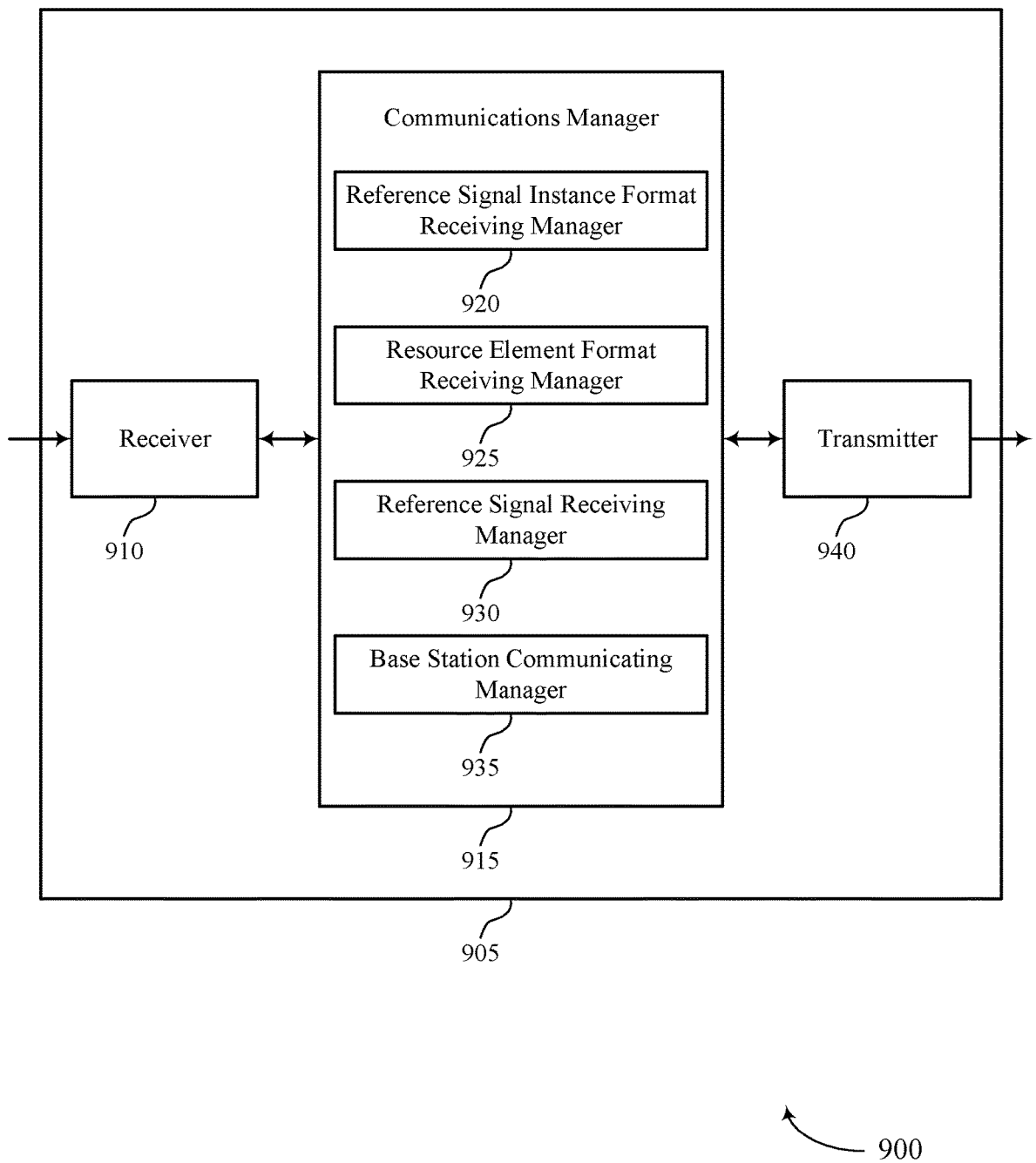

FIG. 9 shows a block diagram 900 of a device 905 that supports techniques for reference signal patterns in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to techniques for reference signal patterns, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a reference signal instance format receiving manager 920, a resource element format receiving manager 925, a reference signal receiving manager 930, and a base station communicating manager 935. The communications manager 915 may be an example of aspects of the communications manager 1110 described herein.

The reference signal instance format receiving manager 920 may receive a first indication of a set of reference signal instances within a set of resources.

The resource element format receiving manager 925 may receive a second indication of a resource element format of a reference signal instance of the set of reference signal instances, the resource element format including one or more null resource elements and one or more reference signal resource elements.

The reference signal receiving manager 930 may receive, from a base station, a reference signal for estimating CFO based on the first indication of the set of reference signal instances and the second indication of the resource element format of the reference signal instance.

The base station communicating manager 935 may communicate with the base station based on receiving the reference signal.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
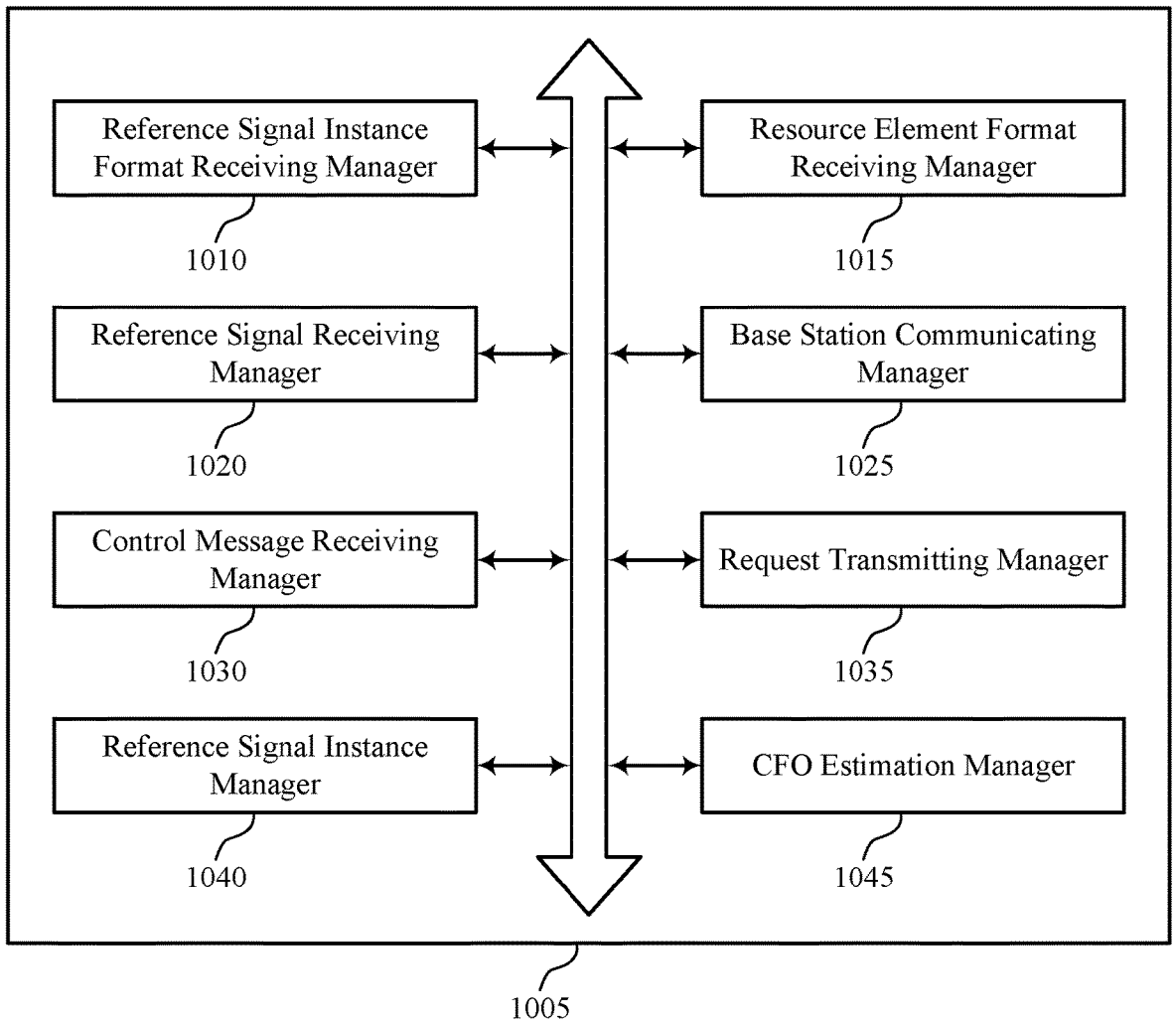
FIG. 10 shows a block diagram of a communications manager that supports techniques for reference signal patterns in accordance with aspects of the present disclosure.

FIG. 10 shows a block diagram 1000 of a communications manager 1005 that supports techniques for reference signal patterns in accordance with aspects of the present disclosure. The communications manager 1005 may be an example of aspects of a communications manager 815, a communications manager 915, or a communications manager 1110 described herein. The communications manager 1005 may include a reference signal instance format receiving manager 1010, a resource element format receiving manager 1015, a reference signal receiving manager 1020, a base station communicating manager 1025, a control message receiving manager 1030, a request transmitting manager 1035, a reference signal instance manager 1040, and a CFO estimation manager 1045. Each of these modules may communicate, directly or indirectly, with one another (e.g., via one or more buses).

The reference signal instance format receiving manager 1010 may receive a first indication of a set of reference signal instances within a set of resources. In some examples, the reference signal instance format receiving manager 1010 may receive a time density indicator associated with the set of reference signal instances, a frequency density indicator associated with the set of reference signal instances, a resource element offset indicator associated with the set of reference signal instances, a symbol offset indicator associated with the set of reference signal instances, or any combination thereof.

The resource element format receiving manager 1015 may receive a second indication of a resource element format of a reference signal instance of the set of reference signal instances, the resource element format including one or more null resource elements and one or more reference signal resource elements.

The reference signal receiving manager 1020 may receive, from a base station, a reference signal for estimating CFO based on the first indication of the set of reference signal instances and the second indication of the resource element format of the reference signal instance. In some examples, the reference signal receiving manager 1020 may perform one or more measurements with the received reference signal. In some cases, a power of the one or more reference signal resource elements within the set of reference signal instances is greater than a power of data elements within the set of resources. In some cases, the reference signal for estimating the CFO includes a PTRS.

The base station communicating manager 1025 may communicate with the base station based on receiving the reference signal. In some examples, the base station communicating manager 1025 may determine one or more parameters associated with communications between the UE and the base station, where transmitting the request is based on determining the one or more parameters. In some cases, the one or more parameters include a modulation and coding scheme, an expected CFO, a BLER, a frequency density associated with the set of resources, a time density associated with the set of resources, an allowable overhead of the set of resources which may be used for the set of reference signal instances, or any combination thereof.

The control message receiving manager 1030 may receive, from the base station, a first control message indicating a set of resource element formats for resource elements within the set of reference signal instances, where receiving the second indication of the resource element format of the reference signal instance is based on receiving the first control message. In some examples, the control message receiving manager 1030 may receive, from the base station, a second control message indicating the resource element format included within the set of resource element formats, where receiving the second indication of the resource element format of the reference signal instance is based on receiving the second control message. In some examples, the control message receiving manager 1030 may receive, from the base station, a control message including the first indication of the set of reference signal instances, the second indication of the resource element format of the reference signal instance, or both. In some cases, the first control message includes an RRC message, a SIB message, or both. In some cases, the second control message includes a DCI message, a MAC-CE message, or both.

The request transmitting manager 1035 may transmit, to the base station, a request for a pattern of a configuration for reference signals associated with estimating the CFO, where receiving the first indication of the set of reference signal instances, the second indication of the resource element format of the reference signal instance, or both, is based on transmitting the request.

The reference signal instance manager 1040 may determine an anchor resource element associated with each reference signal instance of the set of reference signal instances. In some examples, the reference signal instance manager 1040 may determine a position of each reference signal instance within the set of resources based on the anchor resource element associated with each reference signal instance, the time density indicator, the frequency density indicator, the resource element offset indicator, the symbol offset indicator, or any combination thereof, where receiving the reference signal is based on determining the position of each reference signal instance. In some cases, the time density indicator indicates a quantity of reference signal instances per symbol within the set of resources, and the frequency density indicator indicates a quantity of reference signal instances per resource block within the set of resources. In some cases, the resource element offset indicator indicates a first offset in the frequency domain of the set of reference signal instances relative to a first boundary of the set of resources, and where the symbol offset indicator indicates a second offset in the time domain of the set of reference signal instances relative to a second boundary of the set of resources.

In some cases, the reference signal instance includes one or more reference signal resources elements and two or more null resource elements, a null resource element of the two or more null elements positioned between the one or more reference signal resource elements and a resource element used for other information in the frequency domain. In some cases, a first resource element format for resource elements within a first reference signal instance of the set of reference signal instances is different from a second resource element format for resource elements within a second reference signal instance of the set of reference signal instances. In some cases, each reference signal instance is symmetrical in the frequency domain.

In some cases, the reference signal instance spans one resource element in the time domain and spans three or more resource elements in the frequency domain. In some cases, the reference signal instance includes a first reference signal resource element, a second reference signal resource element, and one or more null resource elements positioned between the first reference signal resource element and the second reference signal resource element in the frequency domain. In some cases, the reference signal instance includes a first reference signal resource element and a second reference signal resource element adjacent to the first reference signal resource element in the frequency domain. In some cases, the reference signal instance is positioned at a boundary of the set of resources and one or more null resource elements of the reference signal instance are omitted from the reference signal instance.

The CFO estimation manager 1045 may estimate the CFO based on performing the one or more measurements, where communicating with the base station is based on the estimated CFO.

Figure 11:
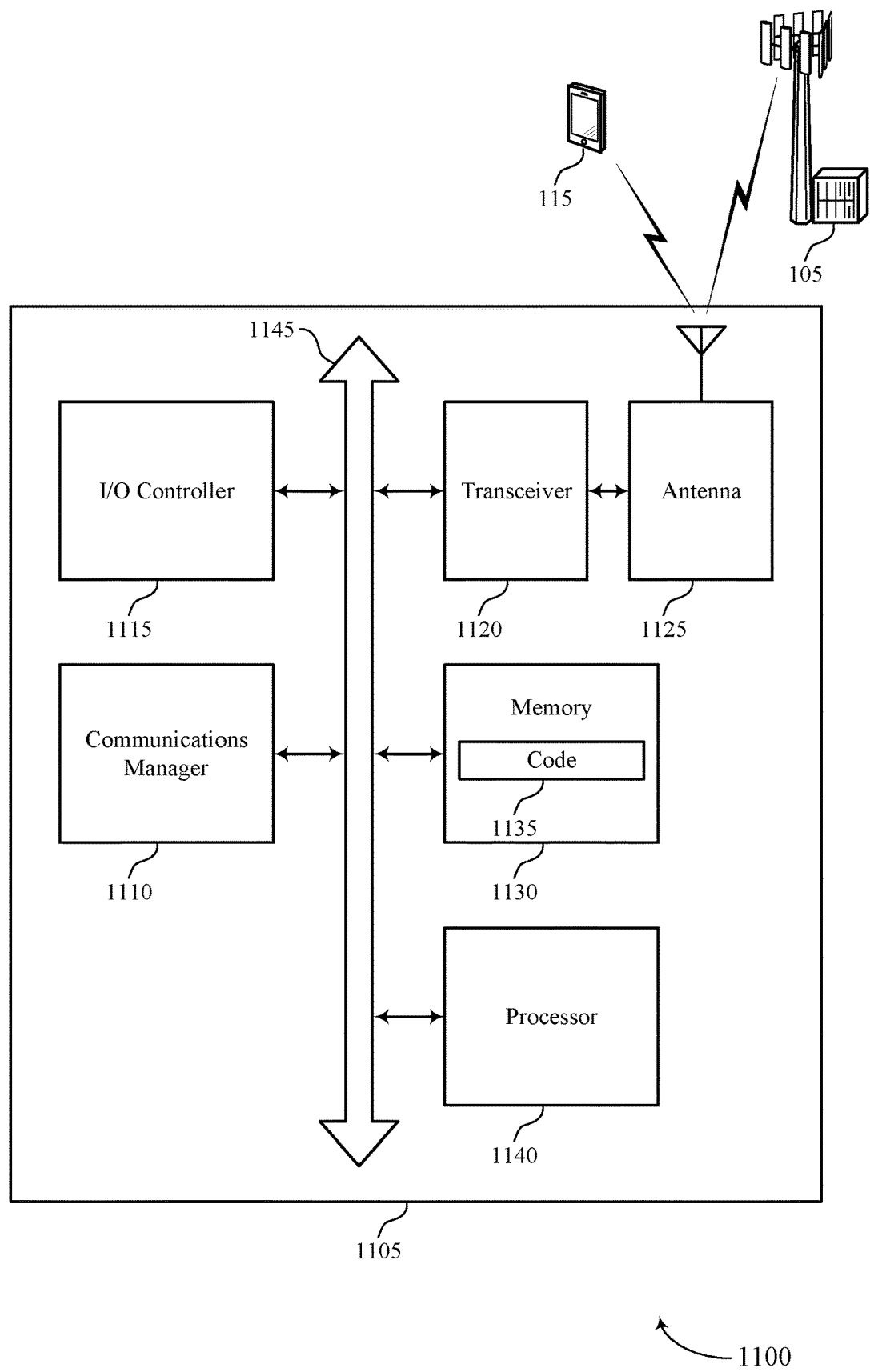
FIG. 11 shows a diagram of a system including a device that supports techniques for reference signal patterns in accordance with aspects of the present disclosure.

FIG. 11 shows a diagram of a system 1100 including a device 1105 that supports techniques for reference signal patterns in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a first indication of a set of reference signal instances within a set of resources, receive a second indication of a resource element format of a reference signal instance of the set of reference signal instances, the resource element format including one or more null resource elements and one or more reference signal resource elements, receive, from a base station, a reference signal for estimating CFO based on the first indication of the set of reference signal instances and the second indication of the resource element format of the reference signal instance, and communicate with the base station based on receiving the reference signal.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for reference signal patterns).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
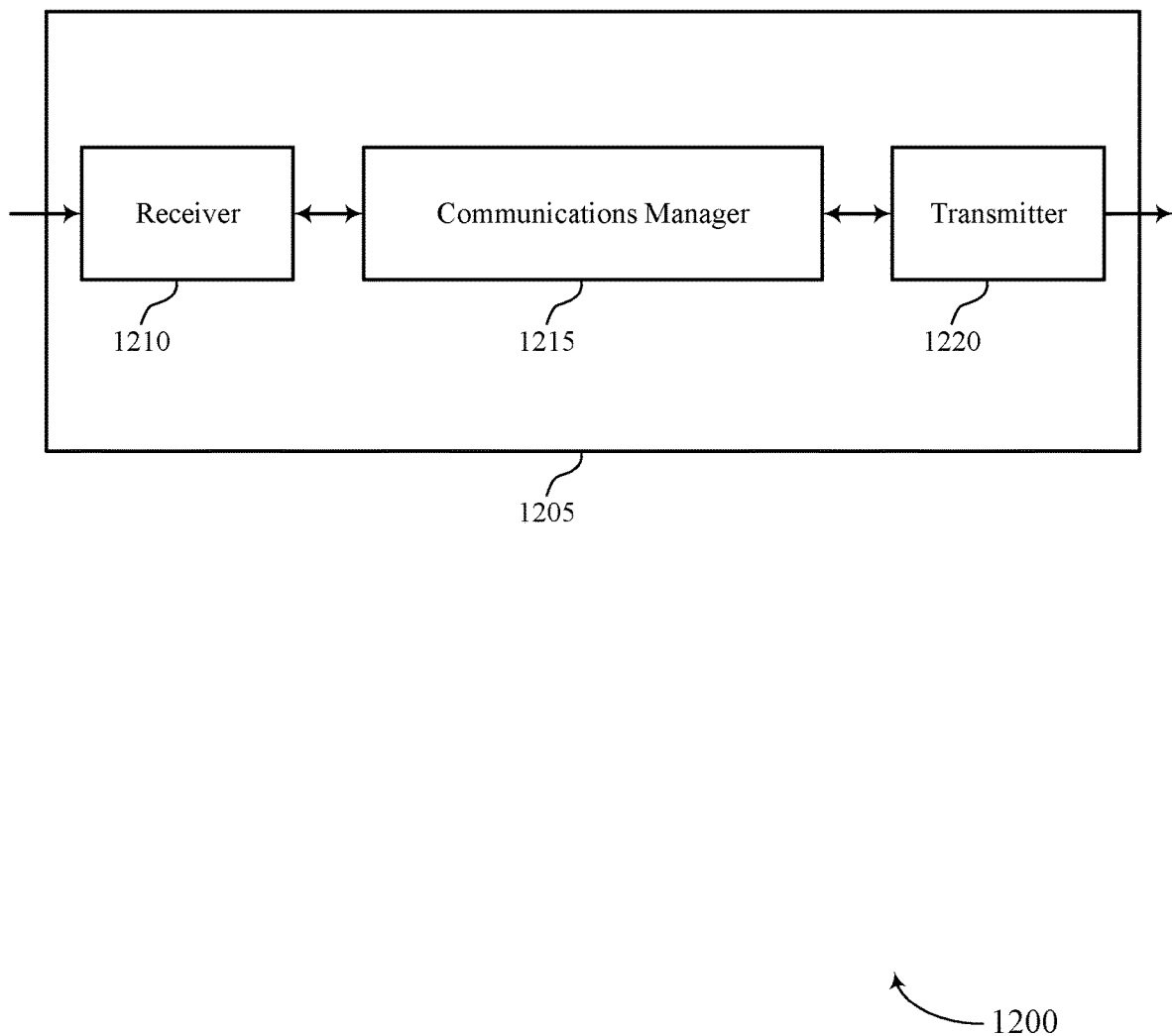
FIGS. 12 and 13 show block diagrams of devices that support techniques for reference signal patterns in accordance with aspects of the present disclosure.

FIG. 12 shows a block diagram 1200 of a device 1205 that supports techniques for reference signal patterns in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for reference signal patterns, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit, to a UE, a first indication of a set of reference signal instances within a set of resources, transmit, to the UE, a second indication of a resource element format of a reference signal instance of the set of reference signal instances, the resource element format including one or more null resource elements and one or more reference signal resource elements, transmit, to the UE, a reference signal for estimating CFO based on the first indication of the set of reference signal instances and the second indication of the resource element format of the reference signal instance, and communicate with the UE based on transmitting the reference signal. The communications manager 1215 may be an example of aspects of the communications manager 1510 described herein.

The actions performed by the communications manager 1215 as described herein may be implemented to realize one or more potential advantages. For example, by providing for improved reference signal formats, techniques described herein may enable reference signals which are less susceptible to CFO, which may thereby improve CFO estimation at the UE 115. By improving the efficiency and accuracy of CFO estimation, techniques described herein may enable the UE 115 and/or the base station 105 to more accurately compensate for estimated CFO, thereby improving the efficiency and reliability of wireless communications.

Based on providing more accurate CFO estimation, a processor of the base station 105 (e.g., a processor controlling the receiver 810, the communications manager 815, the transmitter 820, etc.) may reduce processing resources used for downlink communications. For example, by improving CFO estimation, the UE 115 and/or base station 105 may be able to more accurately compensate for estimated CFO, which may improve the efficiency and reliability of wireless communications. Moreover, by improving CFO estimation and compensation for CFO, techniques described herein may reduce the number of retransmissions used to successfully receive uplink information at the base station 105 and/or transmit downlink information, correspondingly reducing a number of times the processor ramps up processing power and turns on processing units to handle uplink reception and downlink transmission.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
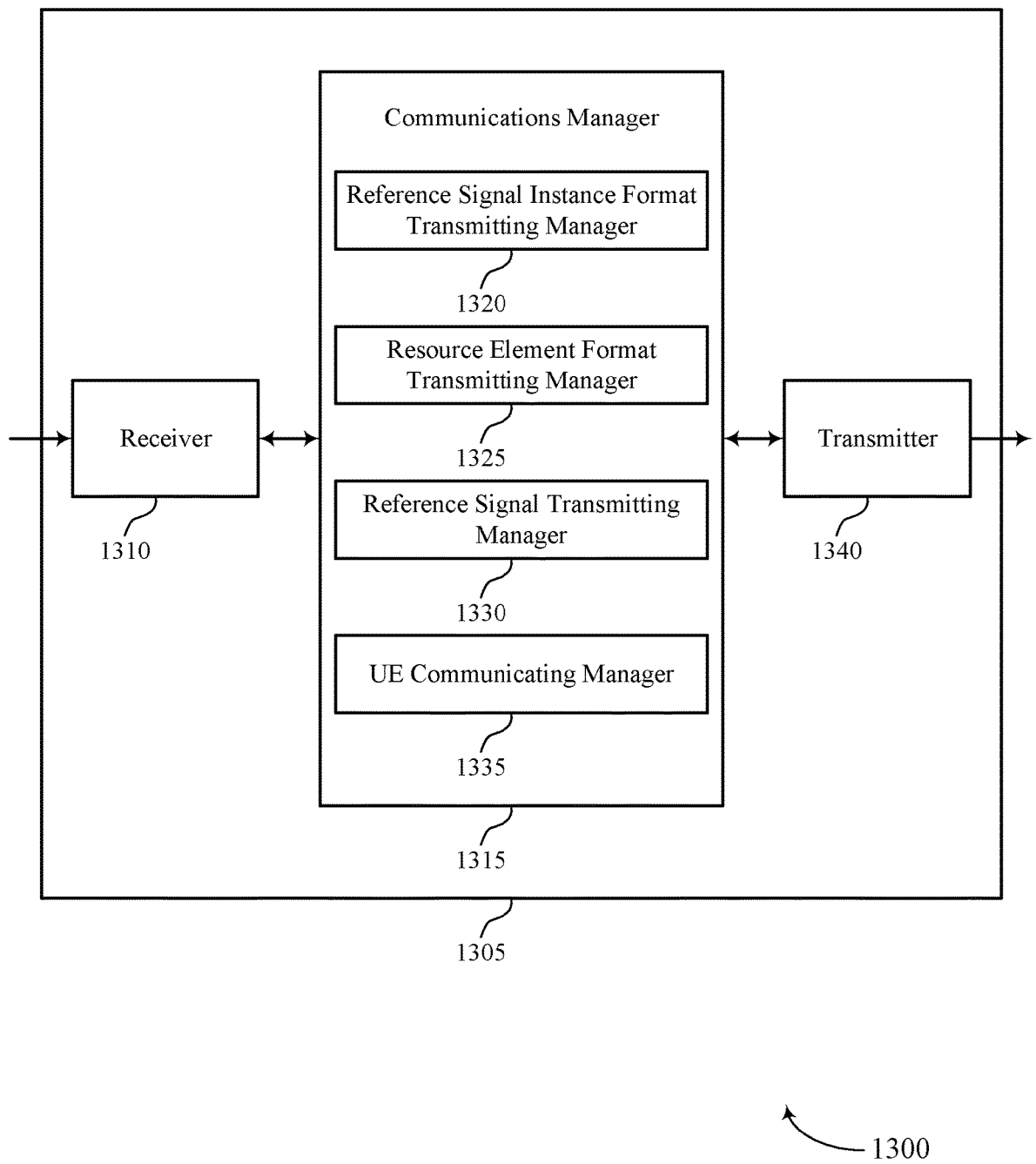

FIG. 13 shows a block diagram 1300 of a device 1305 that supports techniques for reference signal patterns in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for reference signal patterns, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a reference signal instance format transmitting manager 1320, a resource element format transmitting manager 1325, a reference signal transmitting manager 1330, and a UE communicating manager 1335. The communications manager 1315 may be an example of aspects of the communications manager 1510 described herein.

The reference signal instance format transmitting manager 1320 may transmit, to a UE, a first indication of a set of reference signal instances within a set of resources.

The resource element format transmitting manager 1325 may transmit, to the UE, a second indication of a resource element format of a reference signal instance of the set of reference signal instances, the resource element format including one or more null resource elements and one or more reference signal resource elements.

The reference signal transmitting manager 1330 may transmit, to the UE, a reference signal for estimating CFO based on the first indication of the set of reference signal instances and the second indication of the resource element format of the reference signal instance.

The UE communicating manager 1335 may communicate with the UE based on transmitting the reference signal.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
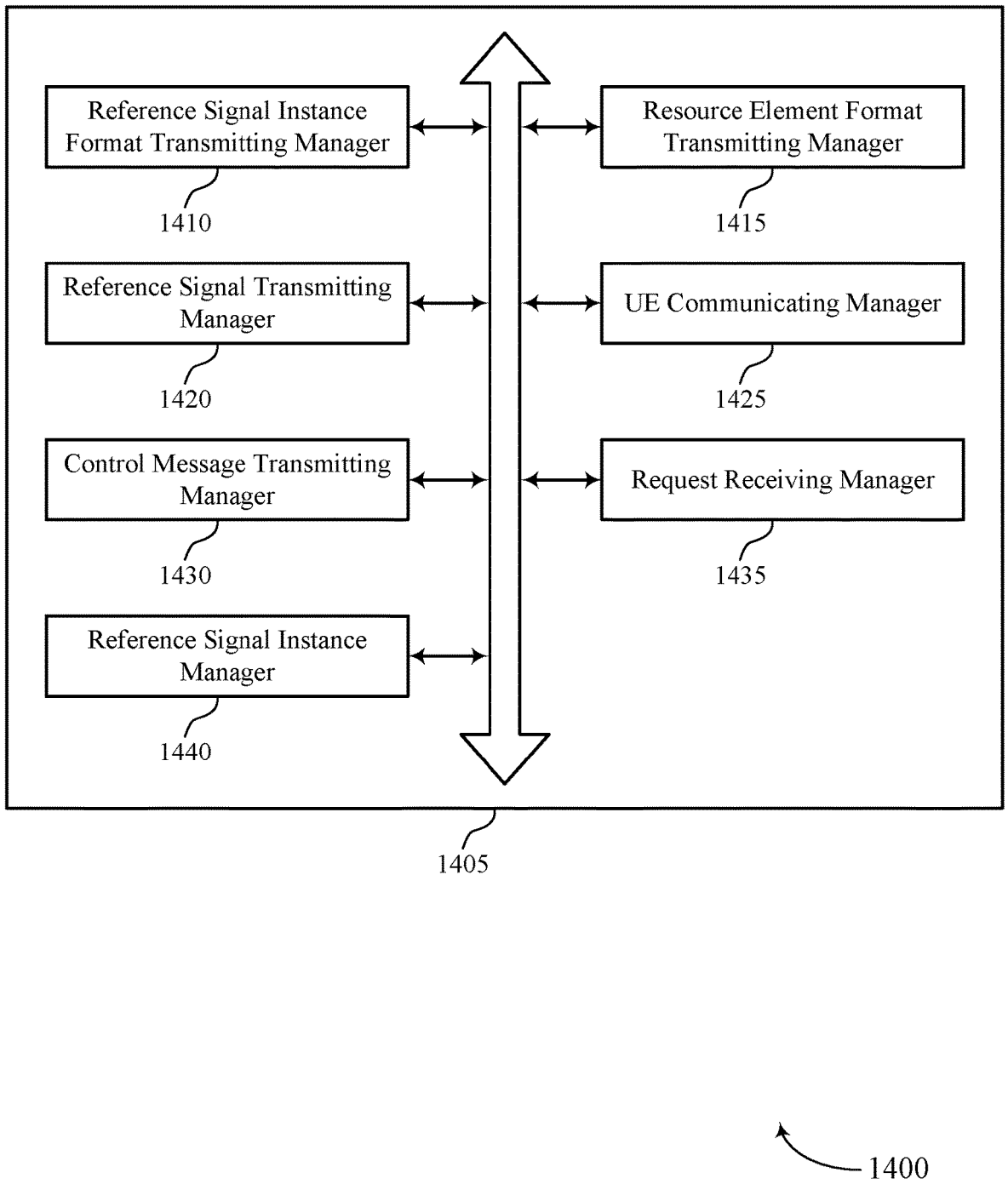
FIG. 14 shows a block diagram of a communications manager that supports techniques for reference signal patterns in accordance with aspects of the present disclosure.

FIG. 14 shows a block diagram 1400 of a communications manager 1405 that supports techniques for reference signal patterns in accordance with aspects of the present disclosure. The communications manager 1405 may be an example of aspects of a communications manager 1215, a communications manager 1315, or a communications manager 1510 described herein. The communications manager 1405 may include a reference signal instance format transmitting manager 1410, a resource element format transmitting manager 1415, a reference signal transmitting manager 1420, a UE communicating manager 1425, a control message transmitting manager 1430, a request receiving manager 1435, and a reference signal instance manager 1440. Each of these modules may communicate, directly or indirectly, with one another (e.g., via one or more buses).

The reference signal instance format transmitting manager 1410 may transmit, to a UE, a first indication of a set of reference signal instances within a set of resources. In some examples, the reference signal instance format transmitting manager 1410 may transmit a time density indicator associated with the set of reference signal instances, a frequency density indicator associated with the set of reference signal instances, a resource element offset indicator associated with the set of reference signal instances, a symbol offset indicator associated with the set of reference signal instances, or any combination thereof.

The resource element format transmitting manager 1415 may transmit, to the UE, a second indication of a resource element format of a reference signal instance of the set of reference signal instances, the resource element format including one or more null resource elements and one or more reference signal resource elements.

The reference signal transmitting manager 1420 may transmit, to the UE, a reference signal for estimating CFO based on the first indication of the set of reference signal instances and the second indication of the resource element format of the reference signal instance. In some cases, a power of the one or more reference signal resource elements within the set of reference signal instances is greater than a power of data elements within the set of resources. In some cases, the reference signal for estimating the CFO includes a PTRS.

The UE communicating manager 1425 may communicate with the UE based on transmitting the reference signal. In some examples, the UE communicating manager 1425 may determine one or more parameters associated with communications between the UE and the base station, where transmitting the first indication of the set of reference signal instances, the second indication of the resource element format, or both, is based on determining the one or more parameters. In some cases, the one or more parameters include a modulation and coding scheme, an expected CFO, a BLER, a frequency density associated with the set of resources, a time density associated with the set of resources, an allowable overhead of the set of resources which may be used for the set of reference signal instances, or any combination thereof.

The control message transmitting manager 1430 may transmit, to the UE, a first control message indicating a set of resource element formats for resource elements within the set of reference signal instances, where transmitting the second indication of the resource element format of the reference signal instance is based on transmitting the first control message. In some examples, the control message transmitting manager 1430 may transmit, to the UE, a second control message indicating the resource element format included within the set of resource element formats, where transmitting the second indication of the resource element format of the reference signal instance is based on receiving the second control message. In some examples, the control message transmitting manager 1430 may transmit, to the UE, a control message including the first indication of the set of reference signal instances, the second indication of the resource element format of the reference signal instance, or both. In some cases, the first control message includes an RRC message, a SIB message, or both. In some cases, the second control message includes a DCI message, a MAC-CE message, or both.

The request receiving manager 1435 may receive, from the UE, a request for a pattern of a configuration for reference signals associated with estimating the CFO, where transmitting the first indication of the set of reference signal instances, the second indication of the resource element format of the reference signal instance, or both, is based on receiving the request.

The reference signal instance manager 1440 may determine an anchor resource element associated with each reference signal instance of the set of reference signal instances. In some examples, the reference signal instance manager 1440 may determine a position of each reference signal instance within the set of resources based on the anchor resource element associated with each reference signal instance, the time density indicator, the frequency density indicator, the resource element offset indicator, the symbol offset indicator, or any combination thereof, where transmitting the reference signal is based on determining the position of each reference signal instance. In some cases, the time density indicator indicates a quantity of reference signal instances per symbol within the set of resources, and the frequency density indicator indicates a quantity of reference signal instances per resource block within the set of resources. In some cases, the resource element offset indicator indicates a first offset in the frequency domain of the set of reference signal instances relative to a first boundary of the set of resources, and where the symbol offset indicator indicates a second offset in the time domain of the set of reference signal instances relative to a second boundary of the set of resources.

In some cases, the reference signal instance includes one or more reference signal resources elements and two or more null resource elements, a null resource element of the two or more null elements positioned between the one or more reference signal resource elements and a resource element used for other information in the frequency domain. In some cases, a first resource element format for resource elements within a first reference signal instance of the set of reference signal instances is different from a second resource element format for resource elements within a second reference signal instance of the set of reference signal instances. In some cases, each reference signal instance is symmetrical in the frequency domain.

In some cases, the reference signal instance spans one resource element in the time domain and spans three or more resource elements in the frequency domain. In some cases, the reference signal instance includes a first reference signal resource element, a second reference signal resource element, and one or more null resource elements positioned between the first reference signal resource element and the second reference signal resource element in the frequency domain. In some cases, the reference signal instance includes a first reference signal resource element and a second reference signal resource element adjacent to the first reference signal resource element in the frequency domain. In some cases, the reference signal instance is positioned at a boundary of the set of resources and one or more null resource elements of the reference signal instance are omitted from the reference signal instance.

Figure 15:
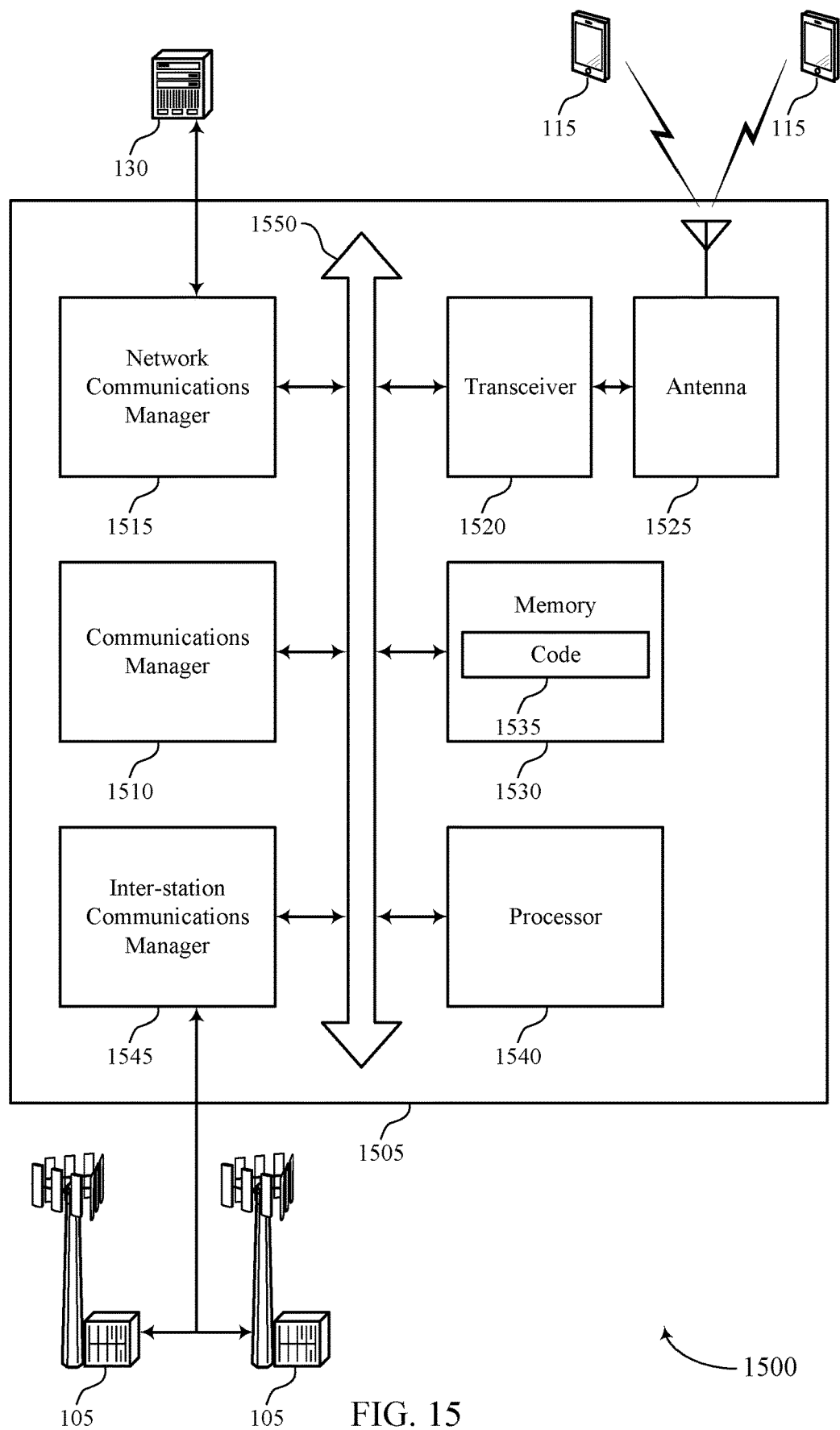
FIG. 15 shows a diagram of a system including a device that supports techniques for reference signal patterns in accordance with aspects of the present disclosure.

FIG. 15 shows a diagram of a system 1500 including a device 1505 that supports techniques for reference signal patterns in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit, to a UE, a first indication of a set of reference signal instances within a set of resources, transmit, to the UE, a second indication of a resource element format of a reference signal instance of the set of reference signal instances, the resource element format including one or more null resource elements and one or more reference signal resource elements, transmit, to the UE, a reference signal for estimating CFO based on the first indication of the set of reference signal instances and the second indication of the resource element format of the reference signal instance, and communicate with the UE based on transmitting the reference signal.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting techniques for reference signal patterns).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
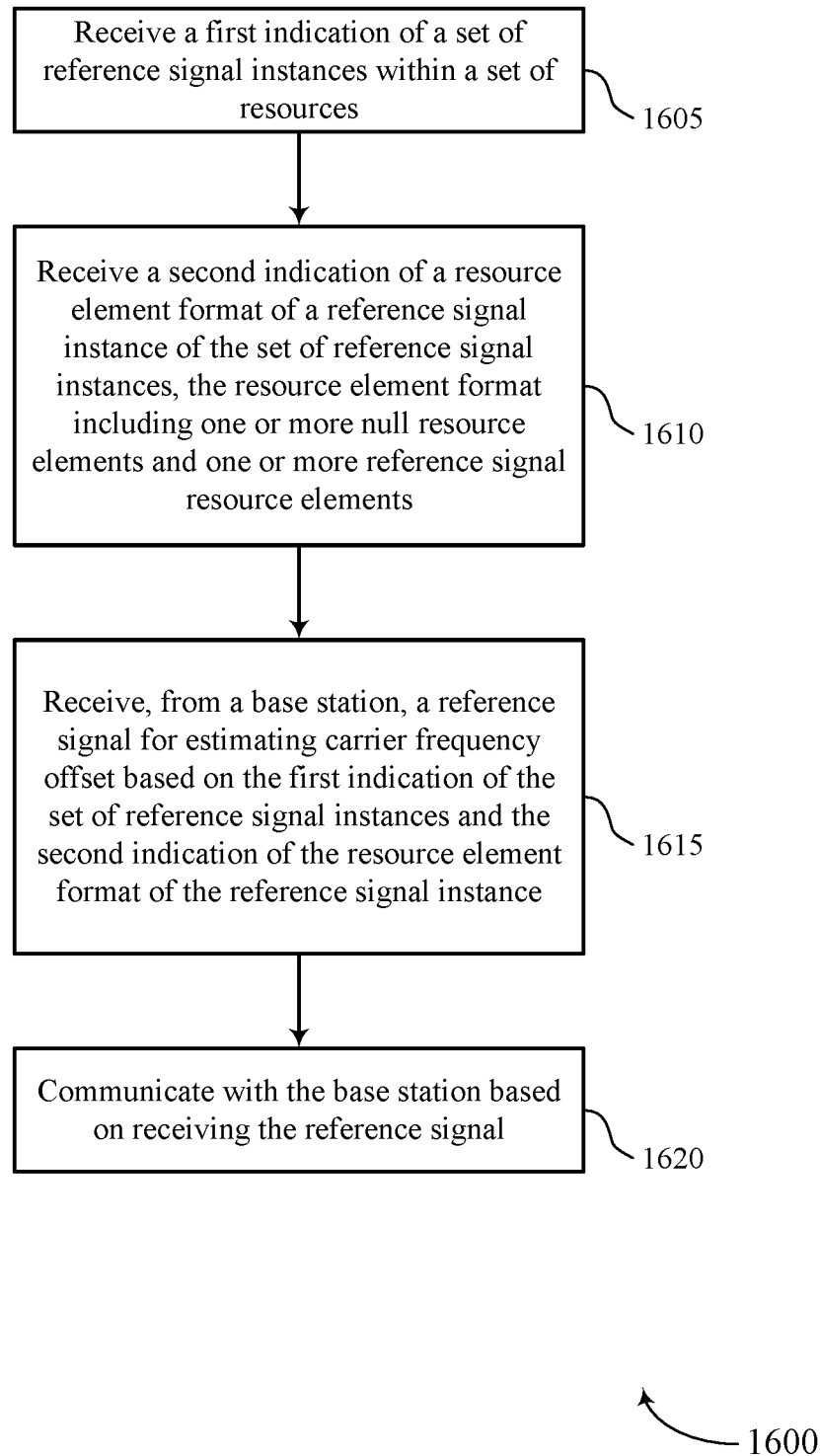
FIGS. 16 through 19 show flowcharts illustrating methods that support techniques for reference signal patterns in accordance with aspects of the present disclosure.

FIG. 16 shows a flowchart illustrating a method 1600 that supports techniques for reference signal patterns in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive a first indication of a set of reference signal instances within a set of resources. The operations of 1605 may be performed according to the methods described herein. In some examples, aspects of the operations of 1605 may be performed by a reference signal instance format receiving manager as described with reference to FIGS. 8 through 11.

At 1610, the UE may receive a second indication of a resource element format of a reference signal instance of the set of reference signal instances, the resource element format including one or more null resource elements and one or more reference signal resource elements. The operations of 1610 may be performed according to the methods described herein. In some examples, aspects of the operations of 1610 may be performed by a resource element format receiving manager as described with reference to FIGS. 8 through 11.

At 1615, the UE may receive, from a base station, a reference signal for estimating CFO based on the first indication of the set of reference signal instances and the second indication of the resource element format of the reference signal instance. The operations of 1615 may be performed according to the methods described herein. In some examples, aspects of the operations of 1615 may be performed by a reference signal receiving manager as described with reference to FIGS. 8 through 11.

At 1620, the UE may communicate with the base station based on receiving the reference signal. The operations of 1620 may be performed according to the methods described herein. In some examples, aspects of the operations of 1620 may be performed by a base station communicating manager as described with reference to FIGS. 8 through 11.

Figure 17:
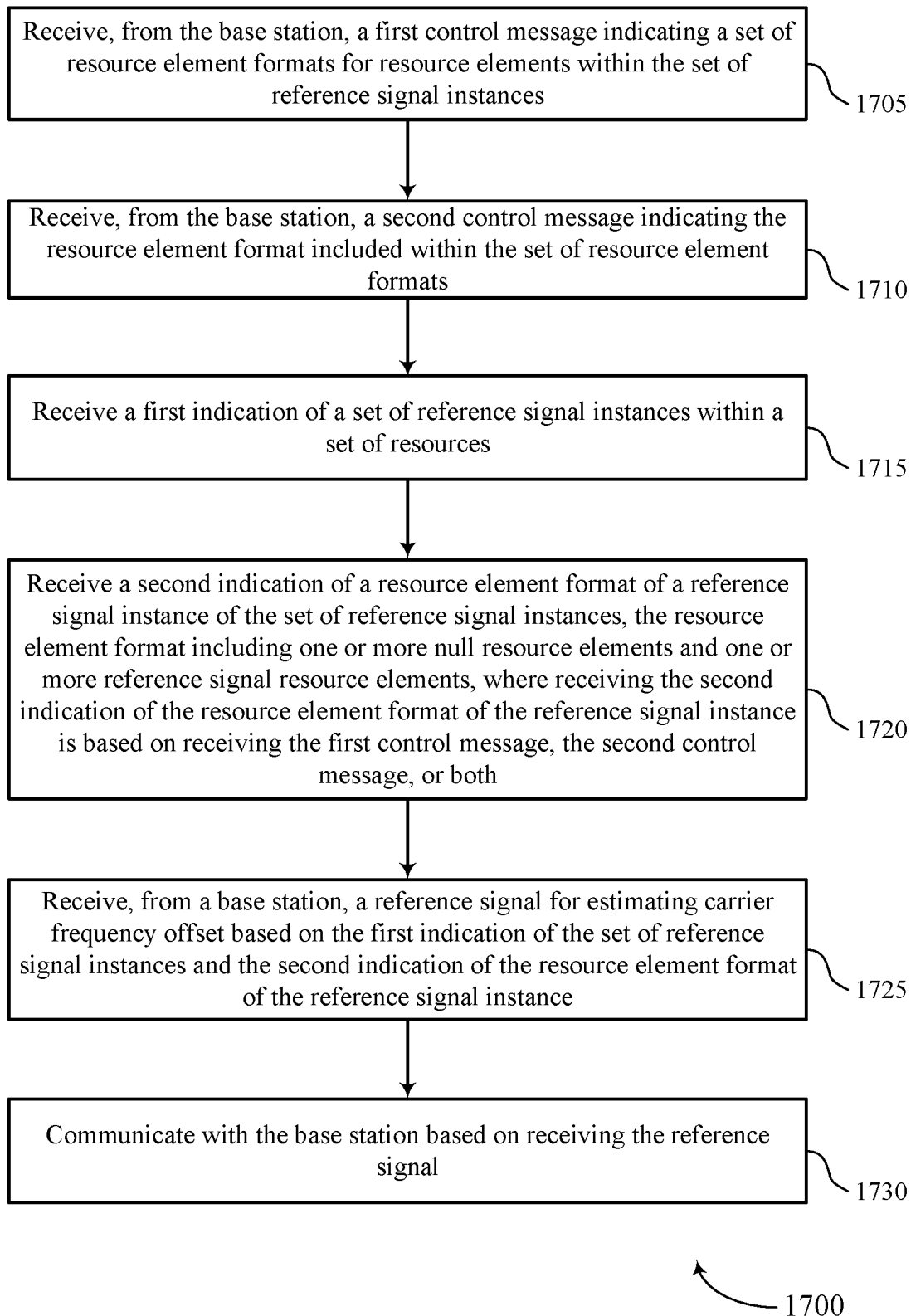

FIG. 17 shows a flowchart illustrating a method 1700 that supports techniques for reference signal patterns in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, from the base station, a first control message indicating a set of resource element formats for resource elements within the set of reference signal instances. The operations of 1705 may be performed according to the methods described herein. In some examples, aspects of the operations of 1705 may be performed by a control message receiving manager as described with reference to FIGS. 8 through 11.

At 1710, the UE may receive, from the base station, a second control message indicating the resource element format included within the set of resource element formats. The operations of 1710 may be performed according to the methods described herein. In some examples, aspects of the operations of 1710 may be performed by a control message receiving manager as described with reference to FIGS. 8 through 11.

At 1715, the UE may receive a first indication of a set of reference signal instances within a set of resources. The operations of 1715 may be performed according to the methods described herein. In some examples, aspects of the operations of 1715 may be performed by a reference signal instance format receiving manager as described with reference to FIGS. 8 through 11.

At 1720, the UE may receive a second indication of a resource element format of a reference signal instance of the set of reference signal instances, the resource element format including one or more null resource elements and one or more reference signal resource elements, where receiving the second indication of the resource element format of the reference signal instance is based on receiving the first control message, the second control message, or both. The operations of 1720 may be performed according to the methods described herein. In some examples, aspects of the operations of 1720 may be performed by a resource element format receiving manager as described with reference to FIGS. 8 through 11.

At 1725, the UE may receive, from a base station, a reference signal for estimating CFO based on the first indication of the set of reference signal instances and the second indication of the resource element format of the reference signal instance. The operations of 1725 may be performed according to the methods described herein. In some examples, aspects of the operations of 1725 may be performed by a reference signal receiving manager as described with reference to FIGS. 8 through 11.

At 1730, the UE may communicate with the base station based on receiving the reference signal. The operations of 1730 may be performed according to the methods described herein. In some examples, aspects of the operations of 1730 may be performed by a base station communicating manager as described with reference to FIGS. 8 through 11.

Figure 18:
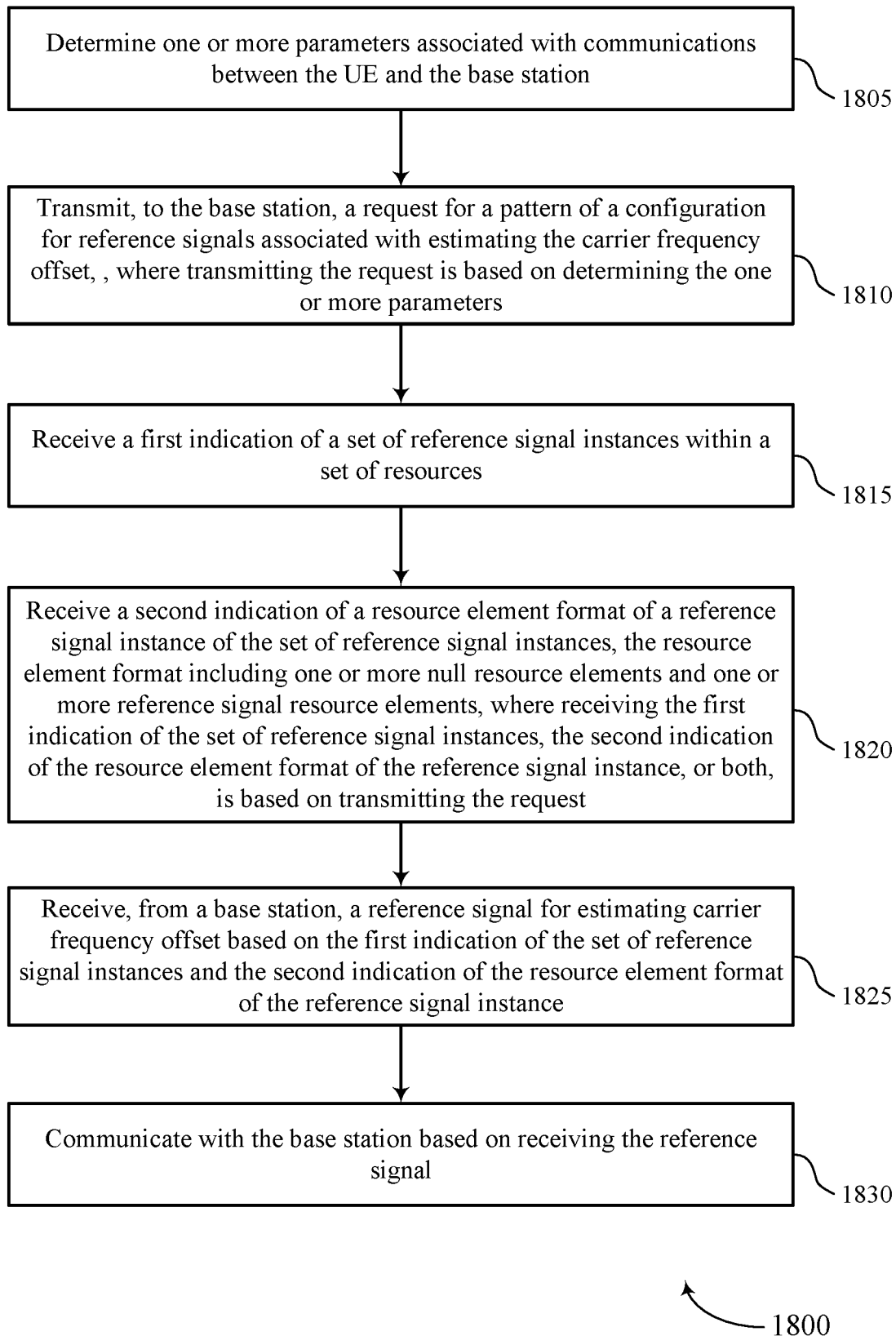

FIG. 18 shows a flowchart illustrating a method 1800 that supports techniques for reference signal patterns in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may determine one or more parameters associated with communications between the UE and the base station. The operations of 1805 may be performed according to the methods described herein. In some examples, aspects of the operations of 1805 may be performed by a base station communicating manager as described with reference to FIGS. 8 through 11.

At 1810, the UE may transmit, to the base station, a request for a pattern of a configuration for reference signals associated with estimating the CFO, where transmitting the request is based on determining the one or more parameters. The operations of 1810 may be performed according to the methods described herein. In some examples, aspects of the operations of 1810 may be performed by a request transmitting manager as described with reference to FIGS. 8 through 11.

At 1815, the UE may receive a first indication of a set of reference signal instances within a set of resources. The operations of 1815 may be performed according to the methods described herein. In some examples, aspects of the operations of 1815 may be performed by a reference signal instance format receiving manager as described with reference to FIGS. 8 through 11.

At 1820, the UE may receive a second indication of a resource element format of a reference signal instance of the set of reference signal instances, the resource element format including one or more null resource elements and one or more reference signal resource elements, where receiving the first indication of the set of reference signal instances, the second indication of the resource element format of the reference signal instance, or both, is based on transmitting the request. The operations of 1820 may be performed according to the methods described herein. In some examples, aspects of the operations of 1820 may be performed by a resource element format receiving manager as described with reference to FIGS. 8 through 11.

At 1825, the UE may receive, from a base station, a reference signal for estimating CFO based on the first indication of the set of reference signal instances and the second indication of the resource element format of the reference signal instance. The operations of 1825 may be performed according to the methods described herein. In some examples, aspects of the operations of 1825 may be performed by a reference signal receiving manager as described with reference to FIGS. 8 through 11.

At 1830, the UE may communicate with the base station based on receiving the reference signal. The operations of 1830 may be performed according to the methods described herein. In some examples, aspects of the operations of 1830 may be performed by a base station communicating manager as described with reference to FIGS. 8 through 11.

Figure 19:
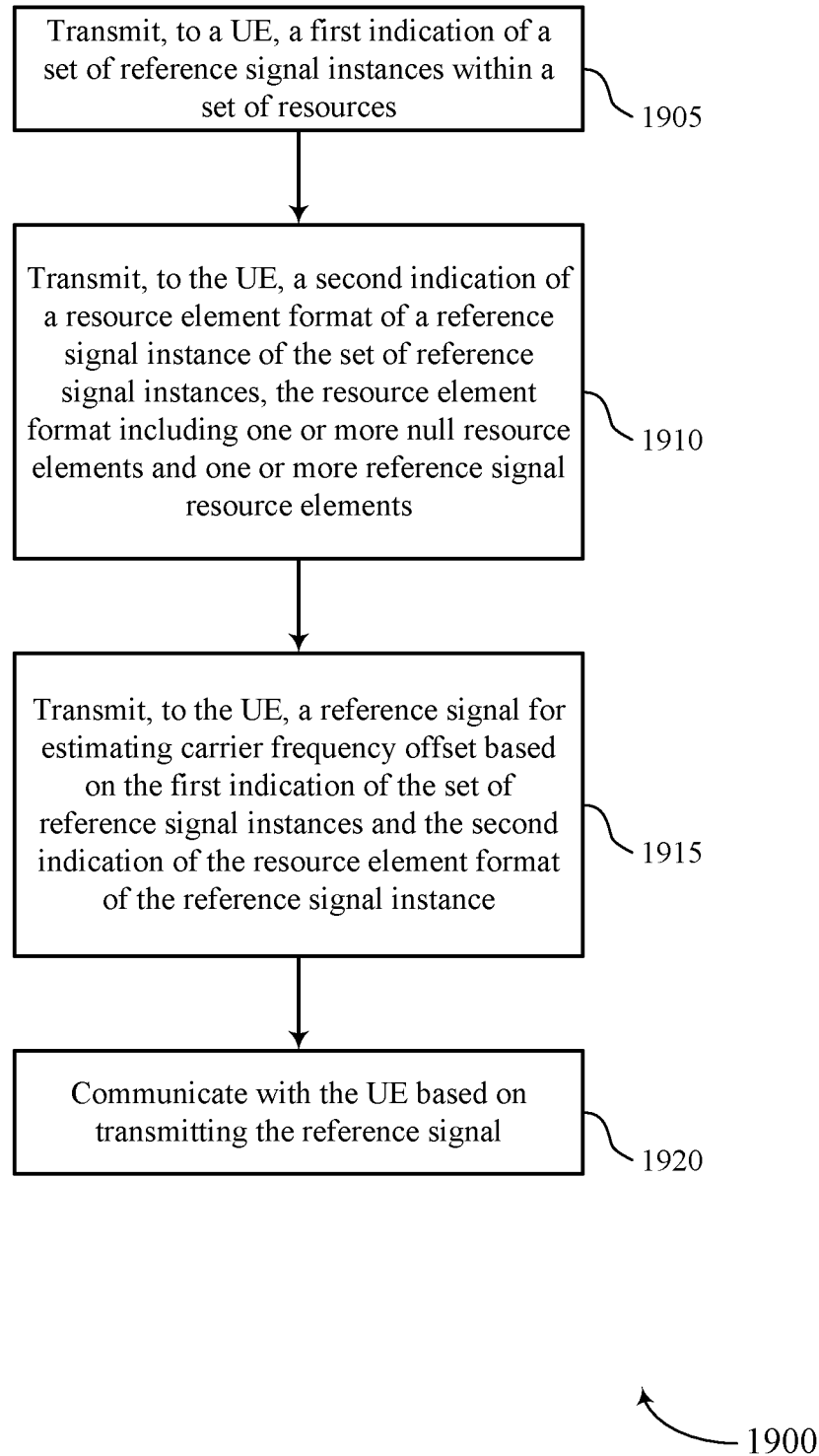

FIG. 19 shows a flowchart illustrating a method 1900 that supports techniques for reference signal patterns in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, a first indication of a set of reference signal instances within a set of resources. The operations of 1905 may be performed according to the methods described herein. In some examples, aspects of the operations of 1905 may be performed by a reference signal instance format transmitting manager as described with reference to FIGS. 12 through 15.

At 1910, the base station may transmit, to the UE, a second indication of a resource element format of a reference signal instance of the set of reference signal instances, the resource element format including one or more null resource elements and one or more reference signal resource elements. The operations of 1910 may be performed according to the methods described herein. In some examples, aspects of the operations of 1910 may be performed by a resource element format transmitting manager as described with reference to FIGS. 12 through 15.

At 1915, the base station may transmit, to the UE, a reference signal for estimating CFO based on the first indication of the set of reference signal instances and the second indication of the resource element format of the reference signal instance. The operations of 1915 may be performed according to the methods described herein. In some examples, aspects of the operations of 1915 may be performed by a reference signal transmitting manager as described with reference to FIGS. 12 through 15.

At 1920, the base station may communicate with the UE based on transmitting the reference signal. The operations of 1920 may be performed according to the methods described herein. In some examples, aspects of the operations of 1920 may be performed by a UE communicating manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, the method comprising: receiving a first indication of a set of reference signal instances within a set of resources; receiving a second indication of a resource element format of a reference signal instance of the set of reference signal instances, the resource element format comprising one or more null resource elements and one or more reference signal resource elements; receiving, from a base station, a reference signal for estimating CFO based at least in part on the first indication of the set of reference signal instances and the second indication of the resource element format of the reference signal instance; and communicating with the base station based at least in part on receiving the reference signal.

Aspect 2: The method of aspect 1, further comprising: receiving, from the base station, a first control message indicating a plurality of resource element formats for resource elements within the set of reference signal instances, wherein receiving the second indication of the resource element format of the reference signal instance is based at least in part on receiving the first control message.

Aspect 3: The method of aspect 2, wherein the first control message comprises a radio resource control message, a system information block message, or both.

Aspect 4: The method of any of aspects 2 through 3, further comprising: receiving, from the base station, a second control message indicating the resource element format included within the plurality of resource element formats, wherein receiving the second indication of the resource element format of the reference signal instance is based at least in part on receiving the second control message.

Aspect 5: The method of aspect 4, wherein the second control message comprises a DCI message, a MAC-CE message, or both.

Aspect 6: The method of any of aspects 1 through 5, further comprising: receiving, from the base station, a control message comprising the first indication of the set of reference signal instances, the second indication of the resource element format of the reference signal instance, or both.

Aspect 7: The method of any of aspects 1 through 6, further comprising: transmitting, to the base station, a request for a pattern of a configuration for reference signals associated with estimating the CFO, wherein receiving the first indication of the set of reference signal instances, the second indication of the resource element format of the reference signal instance, or both, is based at least in part on transmitting the request.

Aspect 8: The method of aspect 7, further comprising: determining one or more parameters associated with communications between the UE and the base station, wherein transmitting the request is based at least in part on determining the one or more parameters.

Aspect 9: The method of aspect 8, wherein the one or more parameters comprise an MCS, an expected CFO, a BLER, a frequency density associated with the set of resources, a time density associated with the set of resources, an allowable overhead of the set of resources which may be used for the set of reference signal instances, or any combination thereof.

Aspect 10: The method of any of aspects 1 through 9, wherein receiving the first indication of the set of reference signal instances within the set of resources comprises: receiving a time density indicator associated with the set of reference signal instances, a frequency density indicator associated with the set of reference signal instances, a resource element offset indicator associated with the set of reference signal instances, a symbol offset indicator associated with the set of reference signal instances, or any combination thereof.

Aspect 11: The method of aspect 10, further comprising: determining an anchor resource element associated with each reference signal instance of the set of reference signal instances; and determining a position of each reference signal instance within the set of resources based at least in part on the anchor resource element associated with each reference signal instance, the time density indicator, the frequency density indicator, the resource element offset indicator, the symbol offset indicator, or any combination thereof, wherein receiving the reference signal is based at least in part on determining the position of each reference signal instance.

Aspect 12: The method of any of aspects 10 through 11, wherein the time density indicator indicates a quantity of reference signal instances per symbol within the set of resources, and the frequency density indicator indicates a quantity of reference signal instances per resource block within the set of resources.

Aspect 13: The method of any of aspects 10 through 12, wherein the resource element offset indicator indicates a first offset in a frequency domain of the set of reference signal instances relative to a first boundary of the set of resources, and the symbol offset indicator indicates a second offset in a time domain of the set of reference signal instances relative to a second boundary of the set of resources.

Aspect 14: The method of any of aspects 1 through 13, wherein the reference signal instance comprises one or more reference signal resources elements and two or more null resource elements, a null resource element of the two or more null resource elements positioned between the one or more reference signal resource elements and a resource element used for other information in a frequency domain.

Aspect 15: The method of any of aspects 1 through 14, wherein a first resource element format for resource elements within a first reference signal instance of the set of reference signal instances is different from a second resource element format for resource elements within a second reference signal instance of the set of reference signal instances.

Aspect 16: The method of any of aspects 1 through 15, wherein each reference signal instance is symmetrical in a frequency domain.

Aspect 17: The method of any of aspects 1 through 16, wherein the reference signal instance spans one resource element in a time domain and spans three or more resource elements in a frequency domain.

Aspect 18: The method of aspect 17, wherein the three or more resource elements in the frequency domain comprise three or more contiguous resource elements in the frequency domain.

Aspect 19: The method of any of aspects 1 through 18, wherein the one or more null resource elements of the reference signal instance comprise one or more empty subcarriers.

Aspect 20: The method of any of aspects 1 through 19, wherein the reference signal instance comprises a first reference signal resource element, a second reference signal resource element, and one or more null resource elements positioned between the first reference signal resource element and the second reference signal resource element in a frequency domain.

Aspect 21: The method of any of aspects 1 through 20, wherein the reference signal instance comprises a first reference signal resource element and a second reference signal resource element adjacent to the first reference signal resource element in a frequency domain.

Aspect 22: The method of any of aspects 1 through 21, wherein the reference signal instance is positioned at a boundary of the set of resources and one or more null resource elements of the reference signal instance are omitted from the reference signal instance.

Aspect 23: The method of any of aspects 1 through 22, further comprising: performing one or more measurements with the received reference signal; and estimating the CFO based at least in part on performing the one or more measurements, wherein communicating with the base station is based at least in part on the estimated CFO.

Aspect 24: The method of any of aspects 1 through 23, wherein a power of the one or more reference signal resource elements within the set of reference signal instances is greater than a power of data elements within the set of resources.

Aspect 25: The method of any of aspects 1 through 24, wherein the reference signal for estimating the CFO comprises a phase tracking reference signal.

Aspect 26: A method for wireless communication at a base station, the method comprising: transmitting, to a UE, a first indication of a set of reference signal instances within a set of resources; transmitting, to the UE, a second indication of a resource element format of a reference signal instance of the set of reference signal instances, the resource element format comprising one or more null resource elements and one or more reference signal resource elements; transmitting, to the UE, a reference signal for estimating CFO based at least in part on the first indication of the set of reference signal instances and the second indication of the resource element format of the reference signal instance; and communicating with the UE based at least in part on transmitting the reference signal.

Aspect 27: The method of aspect 26, further comprising: transmitting, to the UE, a first control message indicating a plurality of resource element formats for resource elements within the set of reference signal instances, wherein transmitting the second indication of the resource element format of the reference signal instance is based at least in part on transmitting the first control message.

Aspect 28: The method of aspect 27, wherein the first control message comprises a radio resource control message, a system information block message, or both.

Aspect 29: The method of any of aspects 27 through 28, further comprising: transmitting, to the UE, a second control message indicating the resource element format included within the plurality of resource element formats, wherein transmitting the second indication of the resource element format of the reference signal instance is based at least in part on receiving the second control message.

Aspect 30: The method of aspect 29, wherein the second control message comprises a DCI message, a MAC-CE message, or both.

Aspect 31: The method of any of aspects 26 through 30, further comprising: transmitting, to the UE, a control message comprising the first indication of the set of reference signal instances, the second indication of the resource element format of the reference signal instance, or both.

Aspect 32: The method of any of aspects 26 through 31, further comprising: receiving, from the UE, a request for a pattern of a configuration for reference signals associated with estimating the CFO, wherein transmitting the first indication of the set of reference signal instances, the second indication of the resource element format of the reference signal instance, or both, is based at least in part on receiving the request.

Aspect 33: The method of any of aspects 26 through 32, further comprising: determining one or more parameters associated with communications between the UE and the base station, wherein transmitting the first indication of the set of reference signal instances, the second indication of the resource element format, or both, is based at least in part on determining the one or more parameters.

Aspect 34: The method of aspect 33, wherein the one or more parameters comprise an MCS, an expected CFO, a BLER, a frequency density associated with the set of resources, a time density associated with the set of resources, an allowable overhead of the set of resources which may be used for the set of reference signal instances, or any combination thereof.

Aspect 35: The method of any of aspects 26 through 34, wherein transmitting the first indication of the set of reference signal instances within the set of resources comprises: transmitting a time density indicator associated with the set of reference signal instances, a frequency density indicator associated with the set of reference signal instances, a resource element offset indicator associated with the set of reference signal instances, a symbol offset indicator associated with the set of reference signal instances, or any combination thereof.

Aspect 36: The method of aspect 35, further comprising: determining an anchor resource element associated with each reference signal instance of the set of reference signal instances; and determining a position of each reference signal instance within the set of resources based at least in part on the anchor resource element associated with each reference signal instance, the time density indicator, the frequency density indicator, the resource element offset indicator, the symbol offset indicator, or any combination thereof, wherein transmitting the reference signal is based at least in part on determining the position of each reference signal instance.

Aspect 37: The method of any of aspects 35 through 36, wherein the time density indicator indicates a quantity of reference signal instances per symbol within the set of resources, and the frequency density indicator indicates a quantity of reference signal instances per resource block within the set of resources.

Aspect 38: The method of any of aspects 35 through 37, wherein the resource element offset indicator indicates a first offset in a frequency domain of the set of reference signal instances relative to a first boundary of the set of resources, and the symbol offset indicator indicates a second offset in a time domain of the set of reference signal instances relative to a second boundary of the set of resources.

Aspect 39: The method of any of aspects 26 through 38, wherein the reference signal instance comprises one or more reference signal resources elements and two or more null resource elements, a null resource element of the two or more null resource elements positioned between the one or more reference signal resource elements and a resource element used for other information in a frequency domain.

Aspect 40: The method of any of aspects 26 through 39, wherein a first resource element format for resource elements within a first reference signal instance of the set of reference signal instances is different from a second resource element format for resource elements within a second reference signal instance of the set of reference signal instances.

Aspect 41: The method of any of aspects 26 through 40, wherein each reference signal instance is symmetrical in a frequency domain.

Aspect 42: The method of any of aspects 26 through 41, wherein the reference signal instance spans one resource element in a time domain and spans three or more resource elements in a frequency domain.

Aspect 43: The method of aspect 42, wherein the three or more resource elements in the frequency domain comprise three or more contiguous resource elements in the frequency domain.

Aspect 44: The method of any of aspects 26 through 43, wherein the one or more null resource elements of the reference signal instance comprise one or more empty subcarriers.

Aspect 45: The method of any of aspects 26 through 44, wherein the reference signal instance comprises a first reference signal resource element, a second reference signal resource element, and one or more null resource elements positioned between the first reference signal resource element and the second reference signal resource element in a frequency domain.

Aspect 46: The method of any of aspects 26 through 45, wherein the reference signal instance comprises a first reference signal resource element and a second reference signal resource element adjacent to the first reference signal resource element in a frequency domain.

Aspect 47: The method of any of aspects 26 through 46, wherein the reference signal instance is positioned at a boundary of the set of resources and one or more null resource elements of the reference signal instance are omitted from the reference signal instance.

Aspect 48: The method of any of aspects 26 through 47, wherein a power of the one or more reference signal resource elements within the set of reference signal instances is greater than a power of data elements within the set of resources.

Aspect 49: The method of any of aspects 26 through 48, wherein the reference signal for estimating the CFO comprises a phase tracking reference signal.

Aspect 50: An apparatus for wireless communication at a UE, comprising a processor; memory coupled with the processor; and instructions stored in the memory and executable by the processor to cause the apparatus to perform a method of any of aspects 1 through 25.

Aspect 51: An apparatus for wireless communication at a UE, comprising at least one means for performing a method of any of aspects 1 through 25.

Aspect 52: A non-transitory computer-readable medium storing code for wireless communication at a UE, the code comprising instructions executable by a processor to perform a method of any of aspects 1 through 25.

Aspect 53: An apparatus for wireless communication at a base station, comprising a processor; memory coupled with the processor; and instructions stored in the memory and executable by the processor to cause the apparatus to perform a method of any of aspects 26 through 49.

Aspect 54: An apparatus for wireless communication at a base station, comprising at least one means for performing a method of any of aspects 26 through 49.

Aspect 55: A non-transitory computer-readable medium storing code for wireless communication at a base station, the code comprising instructions executable by a processor to perform a method of any of aspects 26 through 49.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE), comprising:
a transceiver,
at least one processor,
one or more memories coupled with the at least one processor; and
instructions stored in the one or more memories and operable, when executed by the at least one processor, to cause the UE to:
receive, via the transceiver, a first indication of a set of reference signal instances within a set of resources, wherein:
each reference signal instance of the set of reference signal instances is associated with an anchor resource element, and the first indication comprises a time density indicator associated with the set of reference signal instances, a frequency density indicator associated with the set of reference signal instances, a resource element offset indicator associated with the set of reference signal instances, a symbol offset indicator associated with the set of reference signal instances, or any combination thereof;
receive, via the transceiver, a first control message indicating a plurality of resource element formats, each resource element format of the plurality of resource element formats comprising one or more reference signal resource elements and one or more null resource elements that separate the one or more reference signal resource elements from other subcarriers in a frequency domain;
receive, via the transceiver, a second control message comprising a second indication of a resource element format of the plurality of resource element formats indicated by the first control message, the resource element format associated with a reference signal instance of the set of reference signal instances, the resource element format comprising the one or more null resource elements and the one or more reference signal resource elements;
receive, via the transceiver, a reference signal after receiving the first indication and the second indication, wherein a position of each reference signal instance within the set of resources is based at least in part on the anchor resource element associated with each reference signal instance, the time density indicator, the frequency density indicator, the resource element offset indicator, the symbol offset indicator, or any combination thereof;
perform one or more measurements associated with the received reference signal;
estimate a carrier frequency offset associated with the reference signal based at least in part on the one or more measurements; and
communicate, via the transceiver, with a network entity after receiving the reference signal, said communication being based at least in part on the estimated carrier frequency offset.

2. The UE of claim 1, wherein the at least one processor is further configured to cause the UE to:
receive, via the transceiver, a control message comprising the first indication of the set of reference signal instances, the second indication of the resource element format of the reference signal instance, or both.

3. The UE of claim 1, wherein the at least one processor is further configured to cause the UE to:
transmit, via the transceiver, a request for a pattern of a configuration for reference signals associated with estimating the carrier frequency offset, wherein receiving the first indication of the set of reference signal instances, the second indication of the resource element format of the reference signal instance, or both, occurs after transmitting the request.

4. The UE of claim 3, wherein the at least one processor is further configured to cause the UE to:
communicate, via the transceiver, with the network entity in accordance with one or more parameters.

5. The UE of claim 4, wherein the one or more parameters comprise a modulation and coding scheme, an expected carrier frequency offset, a block error rate, a frequency density associated with the set of resources, a time density associated with the set of resources, an allowable overhead of the set of resources which may be used for the set of reference signal instances, or any combination thereof.

6. The UE of claim 1, wherein:
the time density indicator indicates a quantity of reference signal instances per symbol within the set of resources,
the frequency density indicator indicates a quantity of reference signal instances per resource block within the set of resources, and
the resource element offset indicator indicates a first offset in the frequency domain of the set of reference signal instances relative to a first boundary of the set of resources, or the symbol offset indicator indicates a second offset in a time domain of the set of reference signal instances relative to a second boundary of the set of resources.

7. The UE of claim 1, wherein:
the reference signal instance comprises one or more reference signal resources elements and two or more null resource elements; and
a null resource element of the two or more null resource elements is positioned between the one or more reference signal resource elements and a resource element used for other information in the frequency domain.

8. The UE of claim 1, wherein a first resource element format for resource elements within a first reference signal instance of the set of reference signal instances is different from a second resource element format for resource elements within a second reference signal instance of the set of reference signal instances.

9. The UE of claim 1, wherein each reference signal instance is symmetrical in the frequency domain.

10. The UE of claim 1, wherein:
the reference signal instance spans one resource element in a time domain and spans three or more resource elements in the frequency domain; and
the three or more resource elements in the frequency domain comprise three or more contiguous resource elements in the frequency domain.

11. The UE of claim 1, wherein the one or more null resource elements of the reference signal instance comprise one or more empty subcarriers.

12. The UE of claim 1, wherein the reference signal instance comprises a first reference signal resource element, a second reference signal resource element, and the one or more null resource elements positioned between the first reference signal resource element and the second reference signal resource element in the frequency domain.

13. The UE of claim 1, wherein the reference signal instance comprises a first reference signal resource element and a second reference signal resource element adjacent to the first reference signal resource element in the frequency domain.

14. The UE of claim 1, wherein the reference signal instance is positioned at a boundary of the set of resources and the one or more null resource elements of the reference signal instance are omitted from the reference signal instance.

15. The UE of claim 1, wherein estimating the carrier frequency offset is based at least in part on the position of each reference signal instance within the set of resources.

16. The UE of claim 1, wherein a power of the one or more reference signal resource elements within the set of reference signal instances is greater than a power of data elements within the set of resources, and wherein the reference signal for estimating the carrier frequency offset comprises a phase tracking reference signal.

17. A network entity, comprising:
a transceiver,
at least one processor,
one or more memories coupled with the at least one processor; and
instructions stored in the one or more memories and operable, when executed by the at least one processor, to cause the network entity to:
transmit, via the transceiver, a first indication of a set of reference signal instances within a set of resources, wherein:
each reference signal instance of the set of reference signal instances is associated with an anchor resource element, and the first indication comprises a time density indicator associated with the set of reference signal instances, a frequency density indicator associated with the set of reference signal instances, a resource element offset indicator associated with the set of reference signal instances, a symbol offset indicator associated with the set of reference signal instances, or any combination thereof;
transmit, via the transceiver, a first control message indicating a plurality of resource element formats, each resource element format of the plurality of resource element formats comprising one or more reference signal resource elements and one or more null resource elements that separate the one or more reference signal resource elements from other subcarriers in a frequency domain;
transmit, via the transceiver, a second control message comprising a second indication of a resource element format of the plurality of resource element formats indicated by the first control message, the resource element format associated with a reference signal instance of the set of reference signal instances, the resource element format comprising the one or more null resource elements and the one or more reference signal resource elements;
transmit, via the transceiver, a reference signal after receiving the first indication and the second indication, wherein a position of each reference signal instance within the set of resources is based at least in part on the anchor resource element associated with each reference signal instance, the time density indicator, the frequency density indicator, the resource element offset indicator, the symbol offset indicator, or any combination thereof; and
communicate with a user equipment (UE) based at least in part on transmitting the reference signal.

18. The network entity of claim 17, wherein the at least one processor is further configured to cause the network entity to:
transmit, via the transceiver, a control message comprising the first indication of the set of reference signal instances, the second indication of the resource element format of the reference signal instance, or both.

19. The network entity of claim 17, wherein the at least one processor is further configured to cause the network entity to:
receive, via the transceiver, a request for a pattern of a configuration for reference signals associated with estimating carrier frequency offset, wherein transmitting the first indication of the set of reference signal instances, the second indication of the resource element format of the reference signal instance, or both, occurs after receiving the request.

20. The network entity of claim 17, wherein the first indication of the set of reference signal instances, the second indication of the resource element format, or both, is transmitted based at least in part on one or more parameters associated with communications between the UE and the network entity, wherein the one or more parameters comprise a modulation and coding scheme, an expected carrier frequency offset, a block error rate, a frequency density associated with the set of resources, a time density associated with the set of resources, an allowable overhead of the set of resources which may be used for the set of reference signal instances, or any combination thereof.

21. The network entity of claim 17, wherein:
the time density indicator indicates a quantity of reference signal instances per symbol within the set of resources,
the frequency density indicator indicates a quantity of reference signal instances per resource block within the set of resources,
the resource element offset indicator indicates a first offset in the frequency domain of the set of reference signal instances relative to a first boundary of the set of resources, or
the symbol offset indicator indicates a second offset in a time domain of the set of reference signal instances relative to a second boundary of the set of resources.

22. The network entity of claim 17, wherein:
the reference signal instance comprises one or more reference signal resources elements and two or more null resource elements; and
a null resource element of the two or more null resource elements positioned between the one or more reference signal resource elements and a resource element used for other information in the frequency domain.

23. A method for wireless communication at a user equipment (UE), the method comprising:
receiving a first indication of a set of reference signal instances within a set of resources, wherein:
each reference signal instance of the set of reference signal instances is associated with an anchor resource element, and the first indication comprises a time density indicator associated with the set of reference signal instances, a frequency density indicator associated with the set of reference signal instances, a resource element offset indicator associated with the set of reference signal instances, a symbol offset indicator associated with the set of reference signal instances, or any combination thereof;

receiving a first control message indicating a plurality of resource element formats, each resource element format of the plurality of resource element formats comprising one or more reference signal resource elements and one or more null resource elements that separate the one or more reference signal resource elements from other subcarriers in a frequency domain;

receiving a second control message comprising a second indication of a resource element format of the plurality of resource element formats indicated by the first control message, the resource element format associated with a reference signal instance of the set of reference signal instances, the resource element format comprising the one or more null resource elements and the one or more reference signal resource elements;

receiving a reference signal after receiving the first indication of the set of reference signal instances and the second indication of the resource element format of the reference signal instance, wherein a position of each reference signal instance within the set of resources is based at least in part on the anchor resource element associated with each reference signal instance, the time density indicator, the frequency density indicator, the resource element offset indicator, the symbol offset indicator, or any combination thereof;

performing one or more measurements associated with the received reference signal; and estimating a carrier frequency offset associated with the reference signal based at least in part on the one or more measurements; and communicating with a network entity after receiving the reference signal, said communication being based at least in part on the estimated carrier frequency offset.

24. The method of claim 23, further comprising:
transmitting a request for a pattern of a configuration for reference signals associated with estimating the carrier frequency offset, wherein receiving the first indication of the set of reference signal instances, the second indication of the resource element format of the reference signal instance, or both, is based at least in part on transmitting the request.

25. The method of claim 24, further comprising:
communicating with the network entity in accordance with one or more parameters.

26. The method of claim 25, wherein the one or more parameters comprise a modulation and coding scheme, an expected carrier frequency offset, a block error rate, a frequency density associated with the set of resources, a time density associated with the set of resources, an allowable overhead of the set of resources which may be used for the set of reference signal instances, or any combination thereof.

27. A method for wireless communication at a network entity, the method comprising:
transmitting a first indication of a set of reference signal instances within a set of resources, wherein:
each reference signal instance of the set of reference signal instances is associated with an anchor resource element, and the first indication comprises a time density indicator associated with the set of reference signal instances, a frequency density indicator associated with the set of reference signal instances, a resource element offset indicator associated with the set of reference signal instances, a symbol offset indicator associated with the set of reference signal instances, or any combination thereof;

transmitting a first control message indicating a plurality of resource element formats, each resource element format of the plurality of resource element formats comprising one or more reference signal resource elements and one or more null resource elements that separate the one or more reference signal resource elements from other subcarriers in a frequency domain;

transmitting a second control message comprising a second indication of a resource element format of the plurality of resource element formats indicated by the first control message, the resource element format associated with a reference signal instance of the set of reference signal instances, the resource element format comprising the one or more null resource elements and the one or more reference signal resource elements;

transmitting a reference signal after receiving the first indication of the set of reference signal instances and the second indication of the resource element format of the reference signal instance, wherein a position of each reference signal instance within the set of resources is based at least in part on the anchor resource element associated with each reference signal instance, the time density indicator, the frequency density indicator, the resource element offset indicator, the symbol offset indicator, or any combination thereof; and communicating with a UE based at least in part on transmitting the reference signal.

28. The method of claim 27, further comprising:
transmitting a control message comprising the first indication of the set of reference signal instances, the second indication of the resource element format of the reference signal instance, or both.

29. The method of claim 27, further comprising:
receiving a request for a pattern of a configuration for reference signals associated with estimating carrier frequency offset, wherein transmitting the first indication of the set of reference signal instances, the second indication of the resource element format of the reference signal instance, or both, occurs after receiving the request.

30. The method of claim 27, wherein the first indication of the set of reference signal instances, the second indication of the resource element format, or both, is transmitted based at least in part on one or more parameters associated with communications between the UE and the network entity, wherein the one or more parameters comprise a modulation and coding scheme, an expected carrier frequency offset, a block error rate, a frequency density associated with the set of resources, a time density associated with the set of resources, an allowable overhead of the set of resources which may be used for the set of reference signal instances, or any combination thereof.

* * * * *